US010917328B2

(12) United States Patent
Jha et al.

(10) Patent No.: US 10,917,328 B2
(45) Date of Patent: Feb. 9, 2021

(54) ROUTING UPDATES IN ICN BASED NETWORKS

(71) Applicant: Intel Corporation, Santa Clara, CA (US)

(72) Inventors: Satish Chandra Jha, Hillsboro, OR (US); Kathiravetpillai Sivanesan, Portland, OR (US); Venkatesan Nallampatti Ekambaram, Hillsboro, OR (US); Ravikumar Balakrishnan, Hillsboro, OR (US); Srikathyayani Srikanteswara, Portland, OR (US); S. M. Iftekharul Alam, Hillsboro, OR (US); Ned M. Smith, Beaverton, OR (US); Yi Zhang, Portland, OR (US); Vesh Raj Sharma Banjade, Hillsboro, OR (US); Gabriel Arrobo Vidal, Hillsboro, OR (US); Kuilin Clark Chen, Hillsboro, OR (US); Zongrui Ding, Portland, OR (US); Jessica C. McCarthy, Dublin (IE); Stepan Karpenko, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/454,427

(22) Filed: Jun. 27, 2019

(65) Prior Publication Data
US 2020/0412635 A1 Dec. 31, 2020

(51) Int. Cl.
*H04L 12/751* (2013.01)
*H04L 29/08* (2006.01)
(Continued)

(52) U.S. Cl.
CPC ............ *H04L 45/02* (2013.01); *H04L 45/306* (2013.01); *H04L 47/125* (2013.01); *H04L 67/327* (2013.01)

(58) Field of Classification Search
CPC ..... H04L 45/02; H04L 45/122; H04L 45/306; H04L 45/748; H04L 47/125; H04L 67/28; H04L 67/2842; H04L 67/327
(Continued)

(56) References Cited

U.S. PATENT DOCUMENTS

| | | | |
|---|---|---|---|
| 2013/0107755 A1* | 5/2013 | Wakumoto | .......... H04L 61/2038 370/255 |
| 2017/0302563 A1* | 10/2017 | Wang | ...................... H04L 45/02 |

(Continued)

OTHER PUBLICATIONS

Signorello, S, "Programming information-centric data-planes", 2016 IEEE NetSoft Conference and Workshops (NetSoft), (2016), 6 pgs.
(Continued)

*Primary Examiner* — Harun Chowdhury
(74) *Attorney, Agent, or Firm* — Schwegman Lundberg & Woessner, P.A.

(57) ABSTRACT

Methods are described for providing routing updates in information-centric networks (ICNs) by using a centralized ICN routing coordination unit to exchange updated routing tables with certain popular nodes in popular node segments, by using a routing coordinator that executes an NFN execution plan, or by flooding an ICN-Route-Discovery-Request over multiple ICN route segments between first and second popular nodes, the second node selecting one of the ICN route segments and responding to the ICN-Route-Discovery-Request by sending a unicast Route-Discovery-Response to the first node over the selected one of the ICN route segments. Other methods for providing context aware forwarding for dynamic ICNs such as vehicular networks, RTT estimation for ICNs, and machine learning techniques
(Continued)

for optimizing/compressing a forwarding information based in an ICN node are also provided.

24 Claims, 12 Drawing Sheets

(51) Int. Cl.
*H04L 12/803* (2013.01)
*H04L 12/725* (2013.01)

(58) Field of Classification Search
USPC .......................... 370/254, 389, 392; 709/238
See application file for complete search history.

(56) References Cited

U.S. PATENT DOCUMENTS

2019/0373073 A1* 12/2019 John ..................... H04L 45/306
2020/0089526 A1* 3/2020 Enguehard .............. H04L 45/02

OTHER PUBLICATIONS

Yao, Shuochao, "FastDeepIoT: Towards Understanding and Optimizing Neural Network Execution Time on Mobile and Embedded Devices", SenSys '18, (2018), 14 pgs.

* cited by examiner

ROUTING UPDATES IN ICN BASED NETWORKS

TECHNICAL FIELD

Embodiments described herein generally relate to computer networking and more specifically to techniques for updating routing in an information-centric network (ICN).

BACKGROUND

Information-Centric Networking (ICN) is an umbrella term for a new networking paradigm in which information itself is named and requested from the network instead of hosts (e.g., machines that provide information). To get content, a device requests named content from the network itself. The content request may be called an interest and transmitted via an interest packet. As the interest packet traverses network devices (e.g., routers), a record of the interest is kept. When a device that has content matching the name in the interest is encountered, that device may send a data packet in response to the interest packet. Typically, the data packet is tracked back through the network to the source by following the traces of the interest left in the network devices.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The following description with respect to FIGS. 1-12 sufficiently illustrates specific embodiments to enable those skilled in the art to practice them. Other embodiments may incorporate structural, logical, process, and other changes. Portions and features of some embodiments may be included in, or substituted for, those of other embodiments. Embodiments set forth in the claims encompass all available equivalents of those claims. The example embodiments are presented for illustrative purposes only and are not intended to be restrictive or limiting on the scope of the disclosure or the claims presented herein.

The functions described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware, or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server, or other computer system, turning such computer system into a specifically programmed machine.

ICN System Overview

Figure 1:
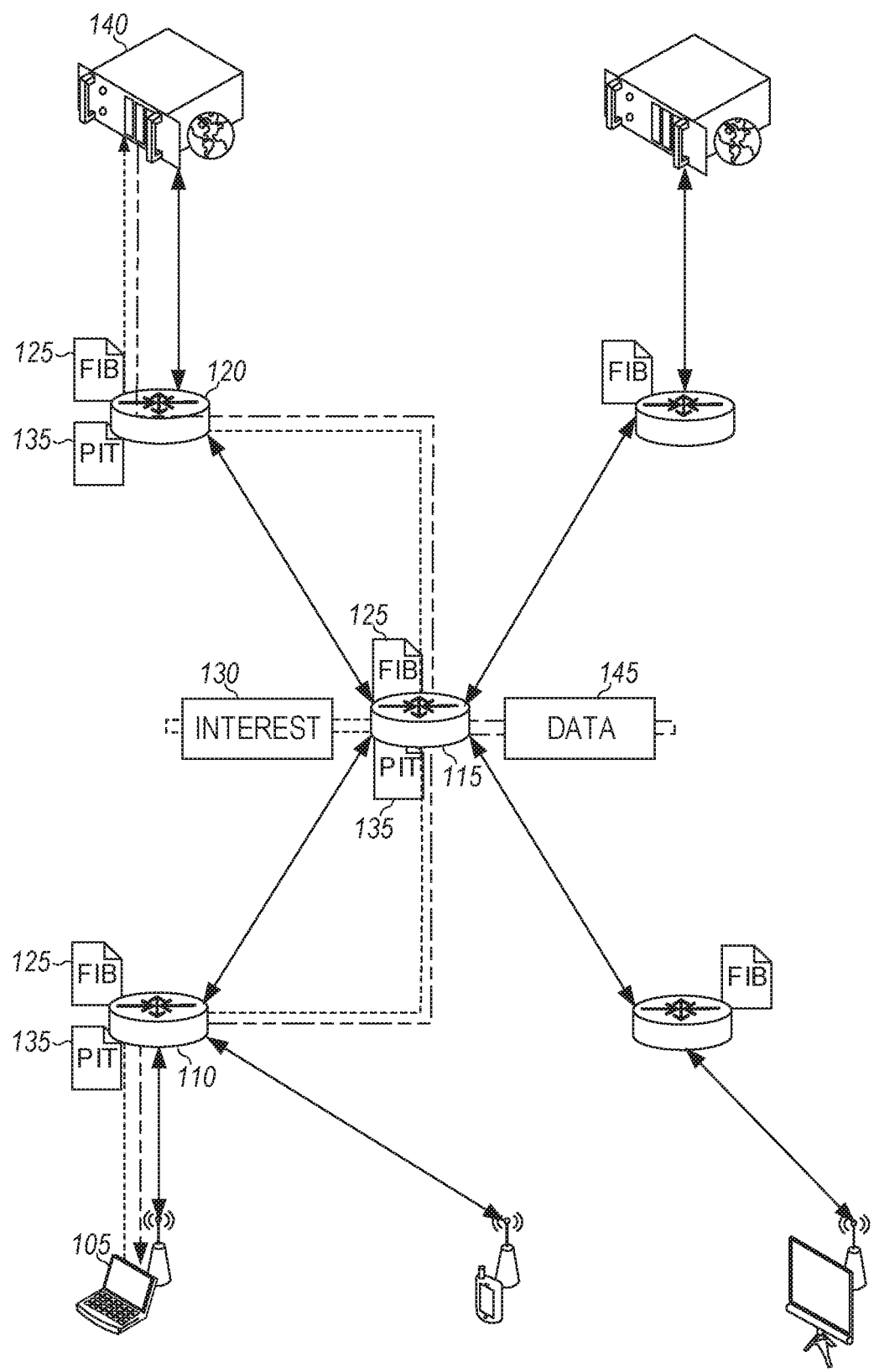
FIG. 1 illustrates an example information-centric network (ICN) according to an embodiment.

FIG. 1 illustrates an example ICN according to an embodiment. ICNs operate differently than traditional host-based (e.g., address-based) communication networks. ICN is an umbrella term for a networking paradigm in which information itself is named and requested from the network instead of hosts (e.g., machines that provide information). In a host-based networking paradigm, such as used in the Internet protocol (IP), a device locates a host and requests content from the host. The network understands how to route (e.g., direct) packets based on the address specified in the packet. In contrast, ICN does not include a request for a particular machine and does not use addresses. Instead, to get content, a device 105 (e.g., subscriber) requests named content from the network itself. The content request may be called an interest and transmitted via an interest packet 130. As the interest packet traverses network devices (e.g., network elements, routers, switches, hubs, etc.)—such as network elements 110, 115, and 120-a record of the interest is kept, for example, in a pending interest table (PIT) 135 at each network element. Thus, network element 110 maintains an entry in its PIT 135 for the interest packet 130, network element 115 maintains the entry in its PIT 135, and network element 120 maintains the entry in its PIT 135.

When a device, such as publisher 140, that has content matching the name in the interest packet 130 is encountered, that device 140 may send a data packet 145 in response to the interest packet 130. Typically, the data packet 145 is tracked back through the network to the source (e.g., device 105) by following the traces of the interest packet 130 left in the network element PITs 135. Thus, the PIT 135 at each network element establishes a trail back to the subscriber 105 for the data packet 145 to follow.

Matching the named data in an ICN may follow several strategies. Generally, the data is named hierarchically, such as with a universal resource identifier (URI). For example, a video may be named www.somedomain.com or videos or v8675309. Here, the hierarchy may be seen as the publisher, "www.somedomain.com," a sub-category, "videos," and the canonical identification "v8675309." As an interest 130 traverses the ICN, ICN network elements will generally attempt to match the name to a greatest degree. Thus, if an ICN element has a cached item or route for both "www.somedomain.com or videos" and "www.somedomain.com or videos or v8675309," the ICN element will match the later for an interest packet 130 specifying "www.somedomain.com or videos or v8675309." In an example, an expression may be used in matching by the ICN device. For example, the interest packet may specify "www.somedomain.com or videos or v8675*" where '*' is a wildcard. Thus, any cached item or route that includes the data other than the wildcard will be matched.

Item matching involves matching the interest 130 to data cached in the ICN element. Thus, for example, if the data 145 named in the interest 130 is cached in network element 115, then the network element 115 will return the data 145 to the subscriber 105 via the network element 110. However, if the data 145 is not cached at network element 115, the network element 115 routes the interest 130 on (e.g., to network element 120). To facilitate routing, the network elements may use a forwarding information base 125 (FIB) to match named data to an interface (e.g., physical port) for the route. Thus, the FIB 125 operates much like a routing table on a traditional network device.

In an example, additional meta-data may be attached to the interest packet 130, the cached data, or the route (e.g., in the FIB 125), to provide an additional level of matching. For example, the data name may be specified as "www.somedomain.com or videos or v8675309," but also include a version number—or timestamp, time range, endorsement, etc. In this example, the interest packet 130 may specify the desired name, the version number, or the version range. The matching may then locate routes or cached data matching the name and perform the additional comparison of meta-data or the like to arrive at an ultimate decision as to whether data or a route matches the interest packet 130 for respectively responding to the interest packet 130 with the data packet 145 or forwarding the interest packet 130.

ICN has advantages over host-based networking because the data segments are individually named. This enables aggressive caching throughout the network as a network element may provide a data packet 130 in response to an interest 130 as easily as an original author 140. Accordingly, it is less likely that the same segment of the network will transmit duplicates of the same data requested by different devices.

Fine grained encryption is another feature of many ICN networks. A typical data packet 145 includes a name for the data that matches the name in the interest packet 130. Further, the data packet 145 includes the requested data and may include additional information to filter similarly named data (e.g., by creation time, expiration time, version, etc.). To address malicious entities providing false information under the same name, the data packet 145 may also encrypt its contents with a publisher key or provide a cryptographic hash of the data and the name. Thus, knowing the key (e.g., from a certificate of an expected publisher 140) enables the recipient to ascertain whether the data is from that publisher 140. This technique also facilitates the aggressive caching of the data packets 145 throughout the network because each data packet 145 is self-contained and secure. In contrast, many host-based networks rely on encrypting a connection between two hosts to secure communications. This may increase latencies while connections are being established and prevents data caching by hiding the data from the network elements.

Example ICN networks include content centric networking (CCN), as specified in the Internet Engineering Task Force (IETF) draft specifications for CCNx 0.x and CCN 1.x, and named data networking (NDN), as specified in the NDN technical report DND-0001.

Cellular ICN Networks

In cellular ICN networks, ICN routes may need to go via specific nodes (such as Evolved Node B (eNB)/Next Generation Node B (gNB), Mobility Management Entity (MME)/Access and Mobility Management Function (AMF), Serving Gateway (SGW)/Packet Data Network (PDN) Gateway (PGW)/User Plane Function (UPF) nodes) as these nodes perform cellular specific functions based on existing cellular data transmission operation/protocol. For example, user's activities are generally tracked at one or more of these nodes in the cellular system. These nodes are referred to herein as Popular Nodes (PNs). It will be appreciated that PNs can be cluster-head, pre-designated nodes in other decentralized networks and are not limited to cellular networks in sample embodiments. The route between these specific PNs are usually multi-hop through intermediate routers. These multi-hop routes (ICN routes between Popular Nodes) are used very frequently for several purposes by many users. A route between any two Popular Nodes will be referred to herein as a Popular-Route-Segment.

In a cellular network, an ICN data/interest packet route will often use one or more Popular-Route-Segments. Therefore, these Popular-Route-Segments need to be updated frequently and proactively, e.g., to maintain load balancing among intermediate routers and to reduce overhead (latency and flooding) of a new ICN route search. Usually, ICN Interest packets and data packet routes (which may include one or more Popular-Route-Segments) need to be updated frequently for several reasons such as to handle the mobility of nodes, to handle changes in caching at the old route, to enable dynamic load balancing at routers, etc. Sample embodiments described herein will describe solutions for maintaining these Popular-Route-Segments up-to-date proactively with or without a Centralized ICN Routing Coordination Unit for controlling Distributed ICN Routing Control and Management Units as well as alternative solutions to keep end-to-end ICN data/interest-packet routes updated in order to reduce latency of content retrieval and signaling overhead (compared to on-demand search of an entire route after getting an ICN Interest packet). The solutions described herein use already existing cellular features for tracking a device/user and its activities. Embodiments described herein also enable a 5G operator to dynamically optimize and adjust load balancing among intermediate routers while optimizing ICN routes performance in an ICN based cellular network.

In sample embodiments, a Centralized ICN Routing Coordination Unit belonging to a cellular operator is responsible for coordinating frequent updating of Popular-Route-Segments between two Popular Nodes. A mechanism is proposed so that the Popular Nodes and intermediate routers may exchange information (such as router load, various link quality/congestion, link-route latency, etc.) frequently with the Centralized ICN Routing Coordination Unit, thus enabling this entity to have a global routing environment. The Centralized ICN Routing Coordination Unit may further assist to select more than one route between a PN-pair. For example, one route may be selected for latency sensitive content and another route may be selected for high data rate latency tolerant content.

Figure 2:
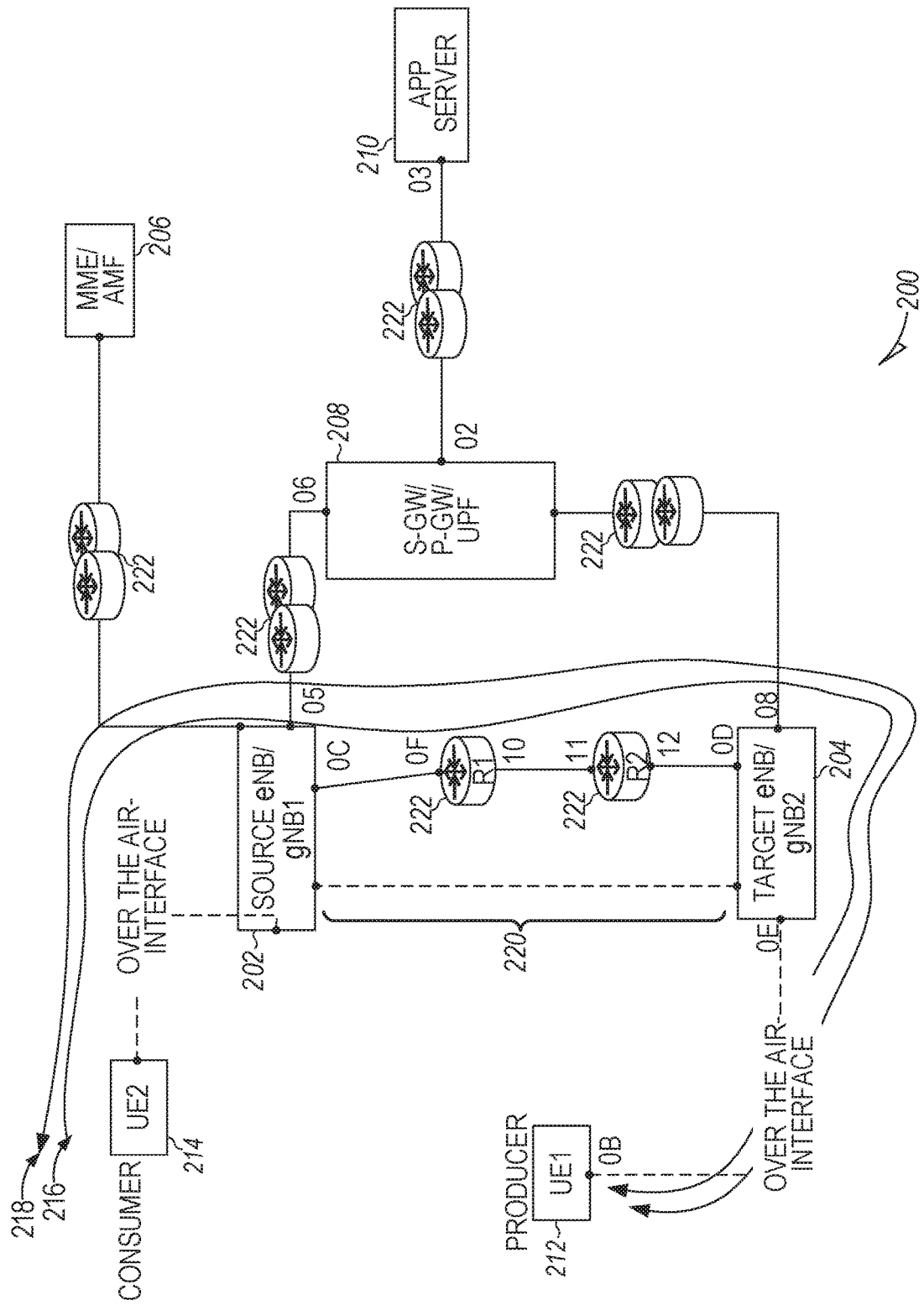
FIG. 2 illustrates an example ICN showing multi-hop routes between Popular Nodes (PNs) used frequently in a cellular network.

NDN % ICN routes (Interest packet and data packet) may need to be updated frequently for several reasons such as load balancing at routers, handling the mobility of nodes, change in caching at the old route, etc. At the same time, there are several multi-hop NDN/ICN routes (between known specific Popular Nodes such as eNBs/gNBs, MMEs/AMFs, SGWs/PGWs/UPFs) as shown in FIG. 2 that are used very frequently for several purposes by several users. FIG. 2 illustrates an example ICN 200 showing multi-hop routes between Popular Nodes 202 and 204 used frequently in a cellular network. Though the Popular Nodes 202 and 204 are neighboring eNBs/gNBs in this example, the Popular Nodes may also be MMEs/AMFs such as MME/AMF 206 or SGWs/PGWs/UPFs such as S-GW/P-GW/UPF 208 connected to app server 210. For example, during handover, source eNB1 202 needs to find a new route to the producer UE1 212 for consumer UE2 214 via target eNB2 204 for some popular content proactively. In this example, an NDN-interest-packet route 216 extends from UE2 214 via Popular Nodes 202 and 204 to UE1 212, while the NDN-content route 218 travels the reverse route from UE1 212 to UE2 214 via Popular Nodes 204 and 202, respectively. Maintaining these ICN routes (e.g., Popular-Route-Segment eNB1-to-eNB2 220) up-to-date proactively via a number of intermediate routers 222 can help reduce latency of content retrieval and signaling overhead as compared to an on-demand route search after getting an interest packet for a content. Routes between these Popular Nodes 202 and 204 are frequently used in cellular networks as these nodes are the major nodes used for mobility anchors, caching, producer discovery, and so on. However, it will be appreciated that other general networks also may include Popular Nodes and the routing techniques as described herein.

Centralized ICN Routing Coordination

A Centralized ICN Routing Coordination Unit may belong to an operator of a cellular infrastructure/backhaul network routing optimization. In some other cases, like an ad-hoc or a distributed network, the Centralized ICN Routing Coordination Unit may be one of the cluster head or a selected leader taking this role. In the latter case, the cluster head or a selected leader may need to communicate frequently to other nodes in a geographical area to obtain a global routing view. One Centralized ICN Routing Coordination Unit may be responsible for a particular geographic area which means that multiple such entities can be implemented by an operator to cover various areas. The Centralized ICN Routing Coordination Unit optimizes routes between Popular Nodes in a more efficient way as it usually has a global view of the status of all intermediate routers between various Popular Nodes.

Popular Nodes and intermediate routers may exchange information (such as router load, various link quality/congestion, link/route latency, etc.) frequently with the Centralized ICN Routing Coordination Unit. The information exchange between the Centralized ICN Routing Coordination Unit and the Popular Nodes/intermediate routers can be done either using ICN based communication or IP based communication on these point-to-point communication links. The Centralized ICN Routing Coordination Unit then uses these global views to update routes between Popular Nodes via various intermediate routers to, for example, balance loads among intermediate routers when the intermediate routers are under the control of the cellular operator. The Centralized ICN Routing Coordination Unit also may recommend more than one route between a Popular Node pair. For example, one route may be recommended for latency sensitive content and another route may be recommended for high data rate latency tolerant content. The Routing InfoTable from the Centralized ICN Routing Coordination Unit can then be frequently sent to a Distributed ICN Control and Management Unit at the Popular Nodes and/or the intermediate routers if the intermediate routers are smart (i.e., capable of processing the Routing InfoTable).

Figure 3:
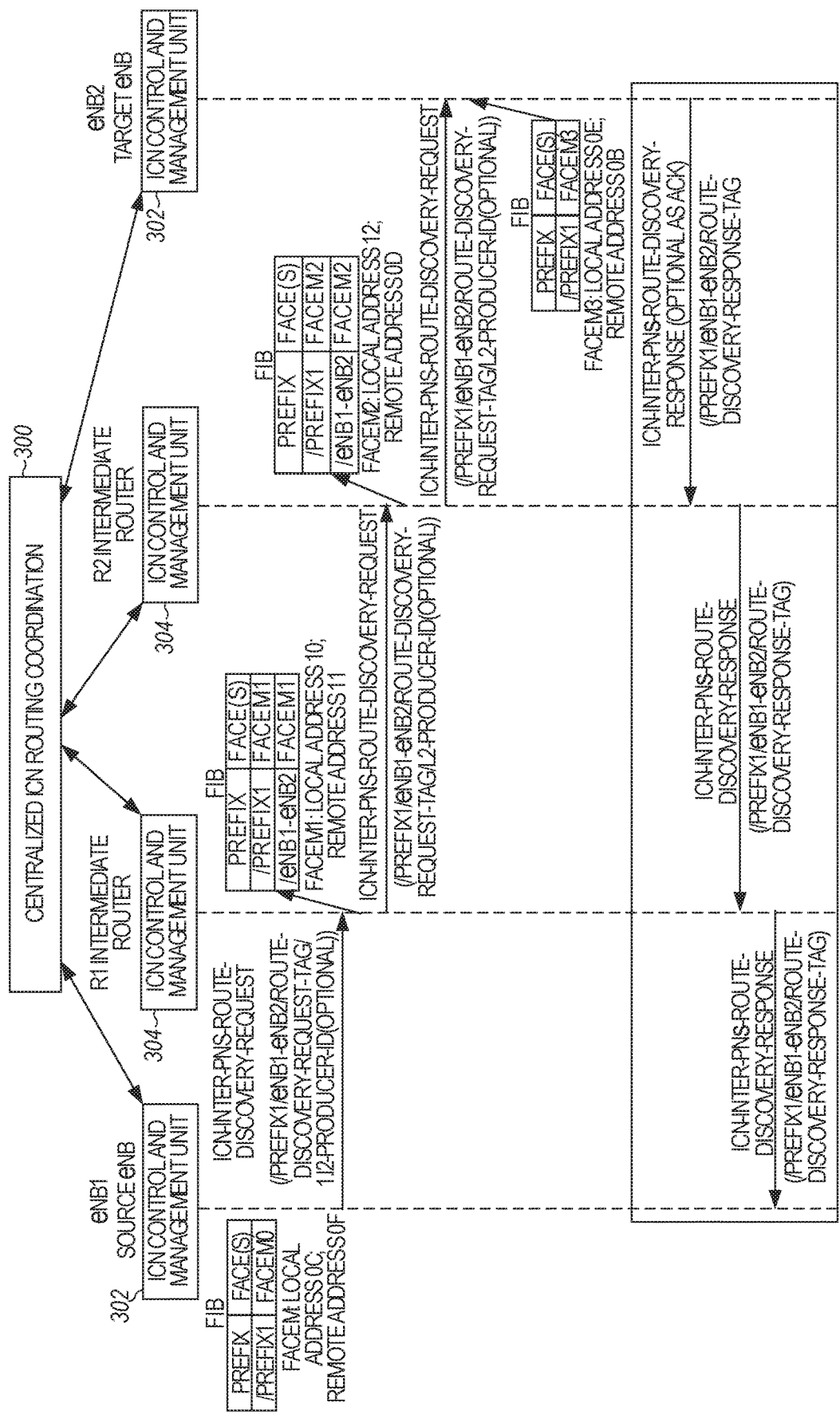
FIG. 3 illustrates an example of an ICN route update between two Popular Nodes (neighboring eNBs/gNBs) and updates to the forwarding information bases (FIBs) at nodes on the new route.

FIG. 3 illustrates an example of an ICN route update between two Popular Nodes eNB1 and eNB2 (neighboring eNBs/gNBs) and updates to the forwarding information bases (FIBs) at nodes on the new route. In FIG. 3, it is assumed that a producer of content with '/prefix1' has moved (handed over) from eNB1 to eNB2, while some consumers (for content with '/prefix1') are still in eNB1. As a result, during or right after hand over, eNB1 is updating a new interest packet forwarding route in advance. L2-Producer-ID is optionally sent so that eNB2 can add a FIB entry as well. However, it will be appreciated that sending L2-Producer-ID in a discovery request is not required to establish a route between the Popular Nodes.

In the example of FIG. 3, the Centralized ICN Routing Coordination Unit 300 in the core network including eNB1, eNB2, intermediate router R1, and intermediate router R2 may frequently select intermediate routers R1 and R2 for a route between the two Popular Nodes eNB1 and eNB2 to balance the load amongst the routers, etc. A Routing InfoTable from the Centralized ICN Routing Coordination Unit 300 can then be sent to the distributed ICN Control and Management Units 302 at each Popular Node, in this case, eNB1 and eNB2. The ICN Control and Management Units 302 at the Popular Nodes eNB1 and eNB2 use this routing information to find a next hop for the ICN route, e.g., during an ICN-Inter-PNs-Route-Discovery process. Also, when the intermediate routers R1 and R2 are "smart," R1 and R2 may also include ICN Control and Management Units 304 for processing the routing information to find a next hop for the ICN route as well. For example, the ICN Control and Management Units 302 and 304 may use the ICN control and management messages (e.g., ICN-Inter-PNs-Route-Discovery-Request and ICN-Inter-PNs-Route-Discovery-Response) to update the routes by adding updated entries in the FIBs at nodes/routers on the route between the Popular Nodes as suggested in the Routing InfoTable from the Centralized ICN Routing Coordination Entity 300. The FIB entry updates are needed to enable ICN Interest packet forwarding in a standard ICN way.

FIG. 3 presents an example for updating the routes for FIB Tables on the Popular Nodes and the intermediate routers for a content with name '/preftx1' between two Popular Nodes where the Popular Nodes are neighboring eNB1 and eNB2. As noted above, in this example it is assumed that a producer of content with '/prefix1' has moved (handed over) from eNB1 to eNB2, while some consumers (for content with '/prefix1') are still in eNB1. As a result, during or right after hand over, eNB1 is updated by an interest packet forwarding route in advance. The intermediate routers R1 and R2 will also add one additional FIB entry with prefix '/eNB1-eNB2' so that eNB1 can also use this route for other content at a future time. For example, if eNB1 needs to send an interest packet for a new content '/prefix-new' for which the producer is in eNB2 or eNB2 has a cache, eNB1 can simply add one additional part in the prefix '/prefix-new/eNB1-eNB2' and forward the interest packet through the same route as that for content '/prefix1'. Intermediate routers R1 and R2 will see the part of the prefix matching with FIB entry /eNB-eNB2 and will forward the interest packet based on the FIB entry for /eNB1-eNB2. FIG. 3 illustrates the respective entries in the FIBs as the ICN-Inter-PNs-Route-Discovery-Request moves from eNB1 to R1, R2, and eNB2.

The ICN-Inter-PNs-Route-Discovery-Response is optional as an acknowledgment mechanism for successful route establishment. As illustrated in FIG. 3, it follows the same route as an ICN-Inter-PNs-Route-Discovery-Request. When the acknowledgment is implemented, the nodes on the route remove the FIB entry after expiry of a timer if the nodes do not receive an acknowledgment or response on the reserved route before the timer expires.

As noted above, in the example of FIG. 3, the ICN Control and Management Unit 302 at the Popular Nodes eNB1 and eNB2 use information in the Routing InfoTable from the Centralized ICN Routing Coordination Unit 300 to fnd a next hop for the ICN route. Therefore, the ICN-Inter-PNs-Route-Discovery-Request can be sent to a next hop as unicast rather than as a flooding/broadcast. That is, the route between the Popular Nodes eNB1 and eNB2 are proactively maintained by the Centralized ICN Routing Coordination Unit 300, and only FIB entries are updated for the ICN by the ICN Control and Management Units 302 at each Popular Node by, for example, sending the ICN-Inter-PNs-Route-Discovery-Request and ICN-Inter-PNs-Route-Discovery-Response. It will be appreciated that such FIB updates are needed to enable traditional ICN interest packet forwarding. However, in some networks (e.g., while the core network is transitioning from an IP to an ICN based system), the Routing InfoTable from the Centralized ICN Routing Coordination Unit 300 may have information about next hops more aligned with IP based routing. In this case, another mapping look-up table may be maintained at the Popular Nodes so that the L2 address or ICN relevant face/address of the next hop can be determined.

A route discovery request containing a special prefix may trigger an action to update the FIB at each intermediate router (as shown, for example, in FIG. 3). This action can be realized in two ways: (i) managing all the intermediate routers under cellular operator control and making them take an FIB update action upon reception of the specific prefix, and (ii) using unmanaged but programmable IP/NDN intermediate routers capable of executing a P4 program, which is a popular language for a programmable IP data plane which has been extended for NDN and other protocols. (See, "NDN.p4: Programming information-centric data-planes," S. Signorello, R. State, J. Frangois, and O. Festor, IEEE NetSoft, 2016.) With the programmable routers between cellular entities, a route may be easily controlled for a given prefix. For example, there could be a traditional IP-based routing protocol or an NDN-based routing protocol (with /NODE_NAME as a prefix) to establish routes between fixed entities. Thus, through P4, for a given prefix (/prefix1/eNB1-eNB2), the intermediate router to read an entry from the routing table for destination eNB2 can be dictated and the associated next hop address may be used to update the FIB table and thereby forward the interest packet.

Figure 4:
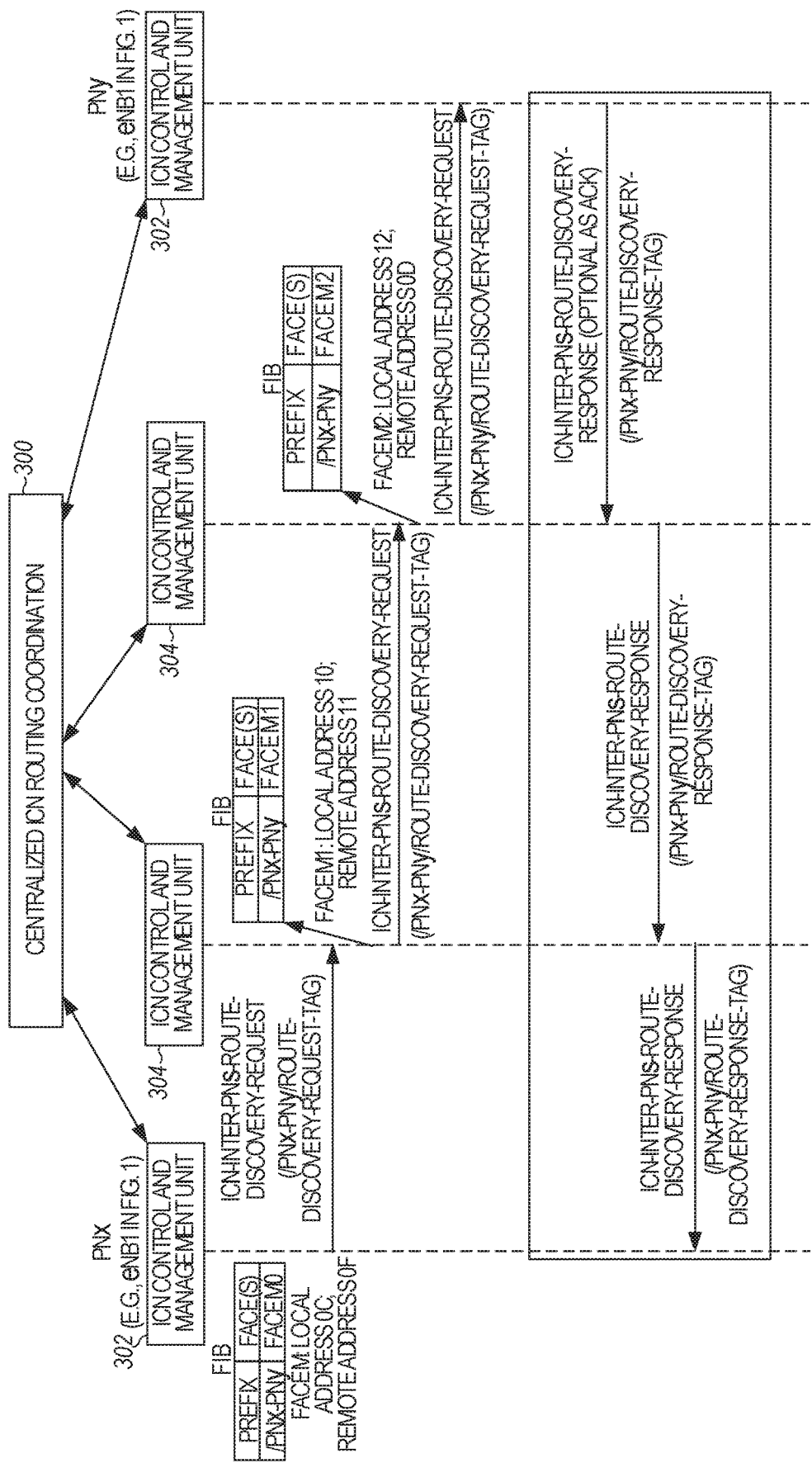
FIG. 4 illustrates an example of an ICN route update between two Popular Nodes (neighboring eNBs/gNBs) and updates to the FIBs at intermediate routers on the new route.

FIG. 4 illustrates an example of an ICN route update between two Popular Nodes (neighboring eNBs/gNBs) and updates to the FIBs at intermediate routers on the new route. As illustrated, for updates, the content '/prefix1' need not be sent.

No Centralized ICN Routing Coordination

Figure 5:
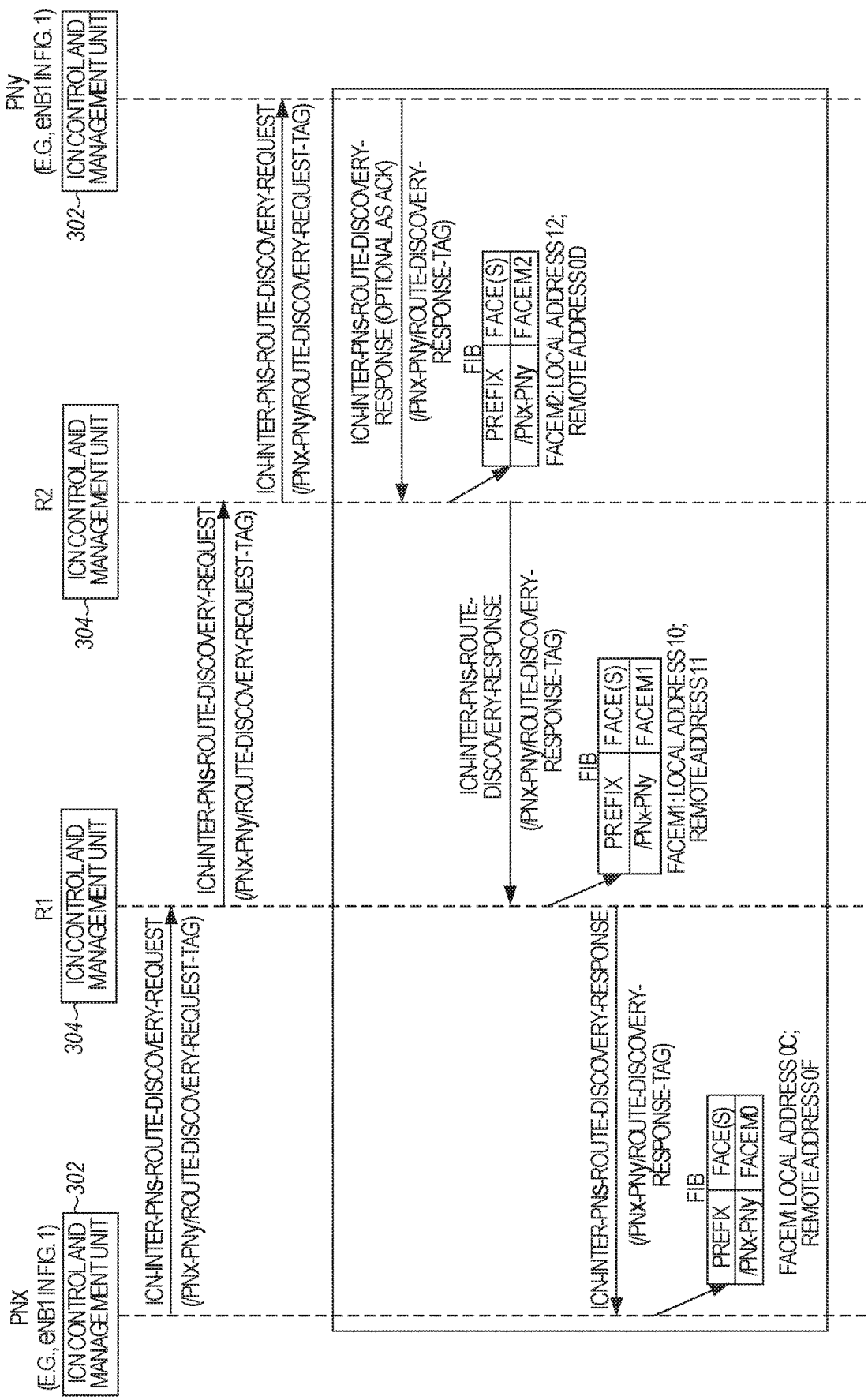
FIG. 5 illustrates an example showing ICN route updates between two Popular Nodes (neighboring eNBs/gNBs) when there is no Centralized ICN Routing Coordination Unit as well as updates to the FIBs at intermediate routers on the new route.

FIG. 5 illustrates an example showing ICN route updates between two Popular Nodes (neighboring eNBs/gNBs) when there is no Centralized ICN Routing Coordination Unit 300, as well as updates to the FIBs at intermediate routers on the new route. A distributed ICN Control and Management Unit 302 is present at each Popular Node and a distributed ICN Control and Management Unit 304 is present at each smart intermediate router. The ICN Control and Management Units 302 and 304 update routes between the PNs (e.g., PNx and PNy) by using ICN control and management messages such as ICN-Inter-PNs-Route-Discovery-Request and ICN-Inter-PNs-Route-Discovery-Response. Since there is no Routing InfoTable from a Centralized ICN Routing Coordination Unit 300 to find a next hop for an ICN route, the ICN Control and Management Unit 302 at PNx floods the ICN-Inter-PNs-Route-Discovery-Request with a route discovery request prefix such as /PNx-PNy /Route-Discovery-Request-Tag. In some cases, PNx may choose to forward a Discovery request to selected next hops based on the previous route (between PNx-PNy) history rather than flooding. The ICN-Inter-PNs-Route-Discovery-Request may reach PNy via multiple paths (i.e., through various sets of intermediate routers such as R1 and R2). PNy selects one of the paths based on some criteria or path cost metrics (such as latency) and responds back by sending an ICN-Inter-PNs-Route-Discovery-Response with a route discovery response prefix such as /PNx-PNy /Route-Discovery-Response-Tag. The ICN-Inter-PNs-Route-Discovery-Response may go through the same path as the selected ICN-Inter-PNs-Route-Discovery-Request path—as unicast. It is noted that unlike the centralized ICN routing coordination case, the ICN-Inter-PNs-Route-Discovery-Response message is mandatory for successful route establishment.

Intermediate routers update FIBs by adding an entry for a prefix such as /PNx-PNy during the ICN-Inter-PNs-Route-Discovery-Response forwarding. In this case, if PNx needs to send an interest packet for new content '/prefix-new' for which the producer is in PNy or PNy has a cache, PNx can simply add one additional part in the prefix '/prefix-new/eNB1-eNB2' and forward the interest packet through the established route for '/PNx-PNv'. Intermediate routers such as R1 and R2 will see the part of prefix matching with FIB entry '/PNx-PNy' and will forward the interest packet based on the FIB entry for '/PNx-PNy'.

Centralized East-West Routing Coordination

ICNs are often overlays on top of existing Edge/IoT architectures. Thus, ICN may be related to north-south and east-west optimization strategies due to inherent properties of underlying physical deployments where the physical deployments are arranged in an Edge architecture showing a hierarchy of services according to latency differentials where the south end has low network latency and the north end has high network latency. East-west terminology implies interactions between nodes having similar latency properties. A mapping to ICN can be described similarly where intermediate ICN nodes/routing nodes as well as producer/consumer nodes can be placed in a grid according to latency differentials from low to high where low is south and high is north. In such a case, east-west represents producer/consumer nodes that may be able to interact through a common or single routing node. North to south caching may allow increased east-west interactions due to similar data locality (being co-resident in the same north-south layer).

East-west optimizations are handled by a central router/orchestrator where the routing optimization methods described above are used for east-west routing of named data networking (NFN) function interest and executions. A mobile edge computing (MEC) orchestration context is used for predictive routing where orchestration is based on knowledge of the Functions as a Service (FaaS) or Platform as a Service (PaaS) execution plan.

TABLE 1

NFN Exec Nan

Workload W1
$C2 = F1:Server3(C1)$
$C3 = F2:Server1(C2)$
$C4 = F3:Server6(C3)$
$C5 = F4:Server2(C4)$
. . .

Figure 6:
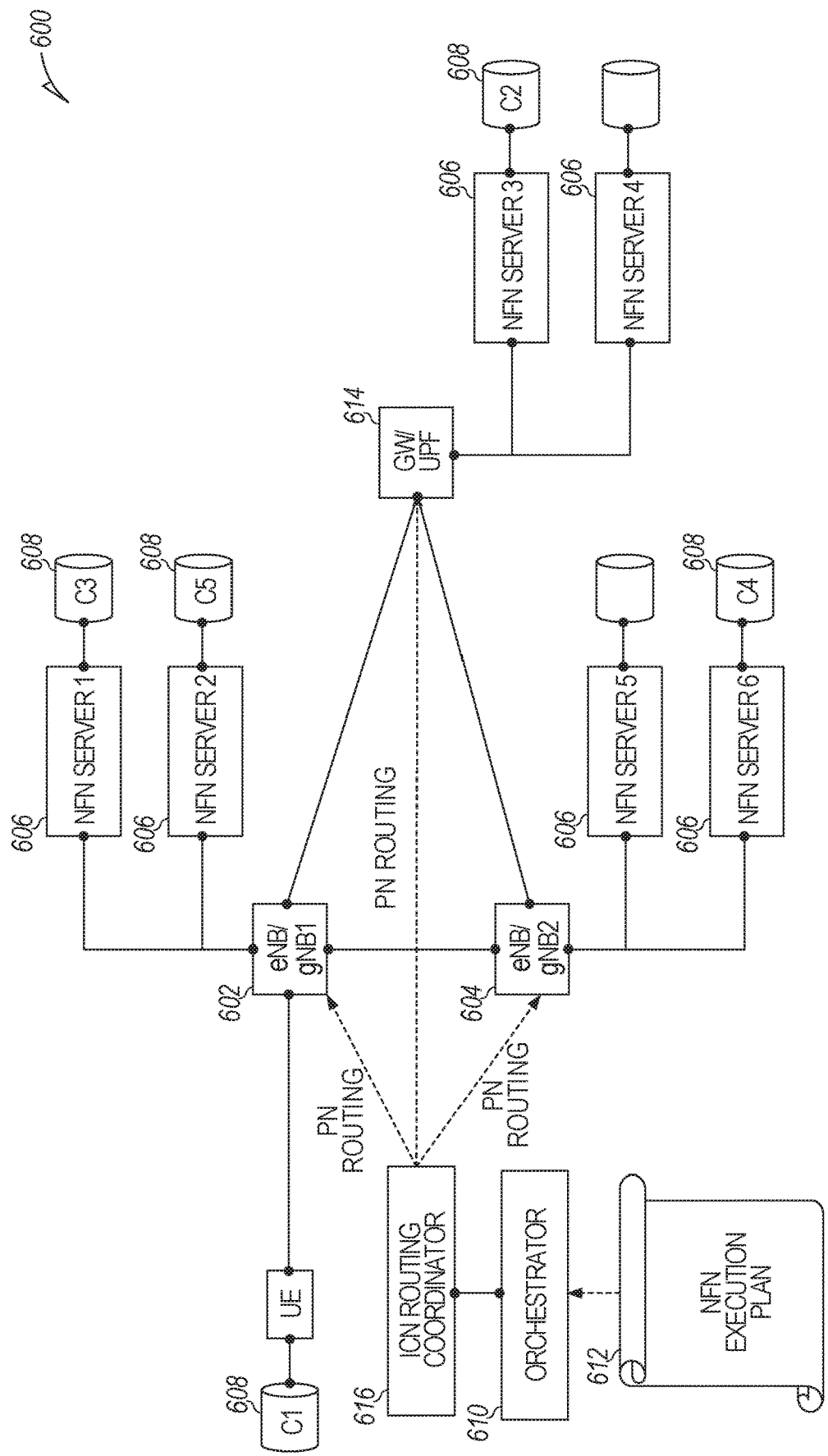
FIG. 6 illustrates an example employing predictive ICN/NDNNFN routing using an NFN execution plan for popularity predictions.

An example FaaS execution plan is described in Table 1 for the network 600 illustrated in FIG. 6, which illustrates predictive ICN/NDN/NFN routing between Popular Nodes eNB/gNB1 602 and eNB/gNB2 604 using an NFN execution plan for popularity predictions. In this example, a workload includes a sequence of NFN function invocations (F1, . . . F4) residing on a set of NFN servers (Server1, . . . , Server6) 606 where the function input includes contents (C1, . . . , C5) 608 and where C1 is the input for function F1, C2 is the function input for F2, C3 is the input for function F3, and C4 is the input for function F4. Furthermore, the function F1 produces content C2, F2 produces content C3, F3 produces content C4, and F4 produces content C5.

The orchestrator 610 knows, a priori, from the NFN execution plan 612 that function F1 precedes function F2 and so forth. The orchestrator 610 uses that knowledge to predict popularity of routing nodes (gNB1 602, gNB2 604 and GW/UPF 614) involving the various producer and consumer nodes. Function results are held in a content store at an NFN server 606. The NFN execution plan 612 dictates which content shows interest in which function. An NFN may show interest in a suitable content (e.g., F1:Server3 may be interested in content C1). Alternatively, a content may show interest in a suitable function (e.g., C1 may be interested in function F1). Since orchestrator 610 knows a priori the full sequence of interest from content to function and function result to a next function, etc., it can inform the ICN routing coordinator 616 to perform east-west predictive routing so that the data and function interests are satisfied using the most appropriate routing nodes. The NFN execution plan 612 will predict the popularity of the Popular Nodes. The nodes selected as the Popular Nodes are those nodes predicted by the NFN execution plan 612 to have a higher popularity than non-selected nodes in the ICN. Appropriate algorithms may be used to implement a most efficient routing strategy given popularity predictions informed by an orchestrator 610 with an NFN execution plan 612.

Infrastructure Assisted Context Aware ICN for Low Latency in Vehicular Networks

The embodiments described above relate to cellular networks. Those skilled in the art will appreciate that the topology and composition of vehicular networks change much faster than traditional cellular networks and thus introduce new problems. The fast-changing topology, the short-lived intermittent connectivity, the wide set of conceived applications with heterogeneous requirements, and the harsh propagation conditions heavily challenge the traditional information centric network deployment for vehicular networks. In vehicular networks, there could be flooding of messages in the network and latency between sending an interest packet and receiving the content could be longer. The highly dynamic nature of the network makes the forwarding and routing of packets quite challenging.

In a sample embodiment, an edge infrastructure may be leveraged by the networked vehicles to perform ICN functions that optimize the latency and reduce the network flooding or overhead. In a vehicular network, content generating and consuming vehicles are present along with the edge infrastructure. The content has mainly spatial or temporal relevance. The content generators and consumers have high mobility within the rules and regulations of the road network.

Figure 7:
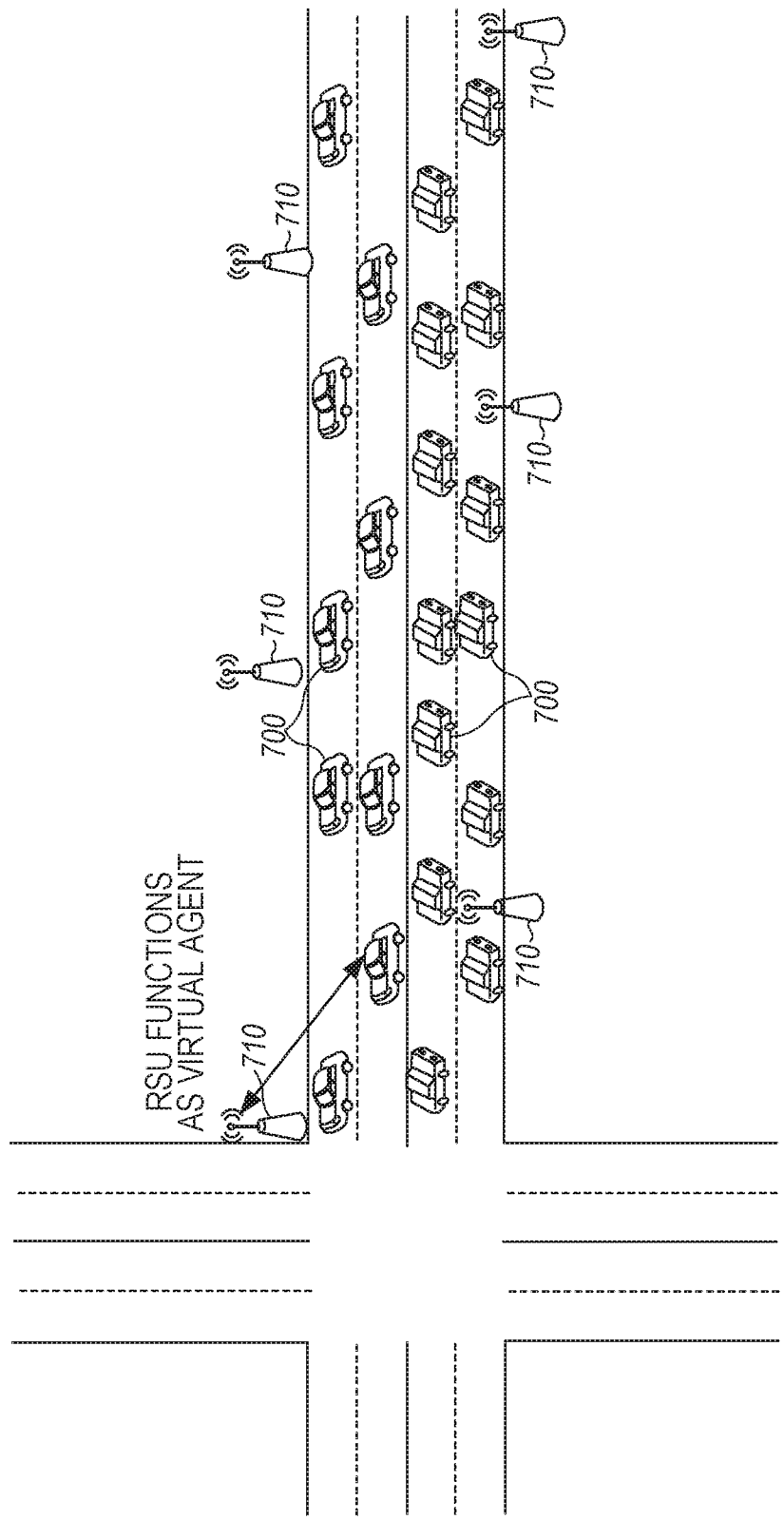
FIG. 7 illustrates a vehicular networking scenario in a sample embodiment.

FIG. 7 illustrates a vehicular networking scenario in a sample embodiment where vehicles 700 communicate with road side units (RSUs) 710. In such a configuration, the content consumer sends their interest packet to RSUs 710 in the network in a unicast fashion with acknowledgement. The RSUs 710 act as a virtual agent for the vehicles 700 and perform the ICN functions to fetch the relevant content within the edge network. These RSUs 710 avoid flooding the network with interest packets and reduce latency for a better user experience by performing the following:
1. Context aware caching based on location, lifespan of information, and other temporal aspects, vehicle density, etc.;
2. Context aware routing based on the edge and number of hops; and
3. Priority based interest packet forwarding including interest packet merging and splitting or multipathing.

Figure 8:
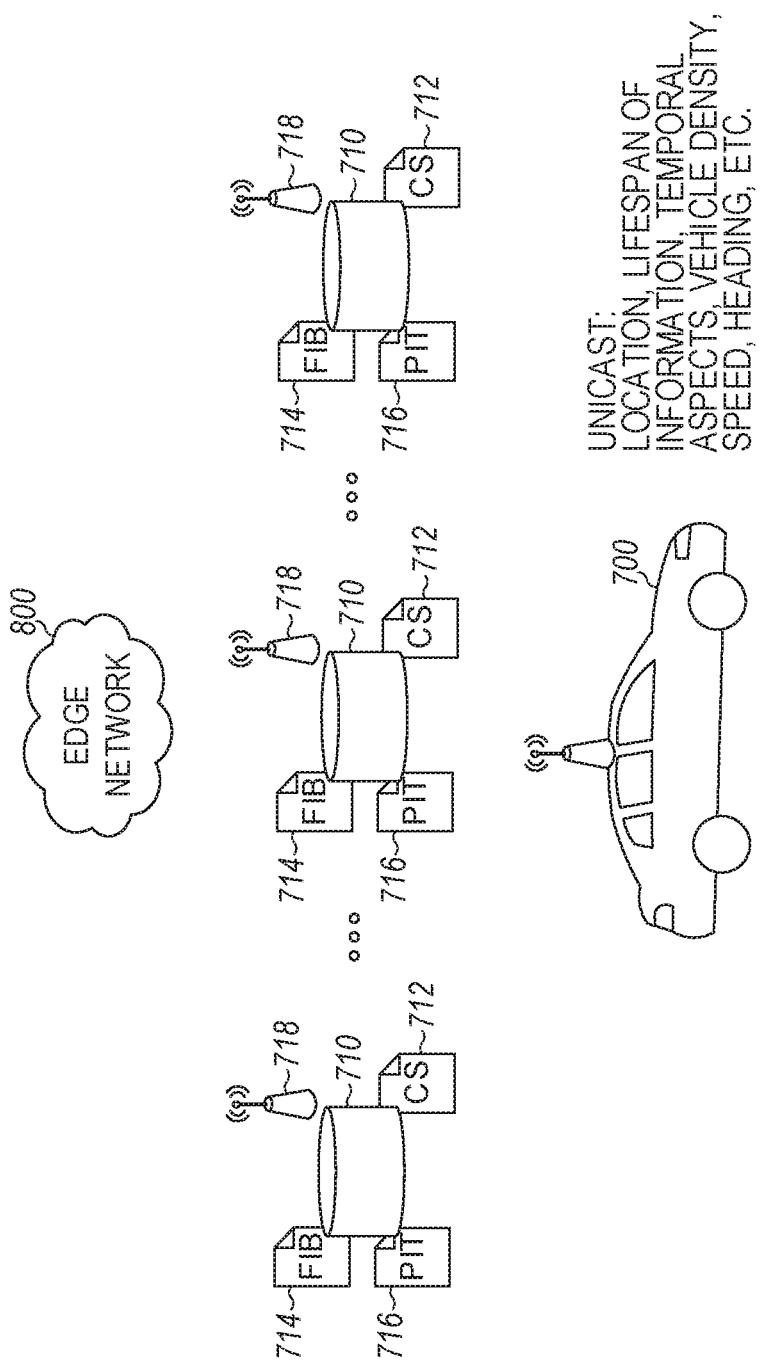
FIG. 8 illustrates the vehicular networking scenario of FIG. 7 with the road side units shown in more detail.

As illustrated in the vehicular network scenario shown in FIG. 8, vehicles 700 may communicate with road side edge infrastructure including the road side units (RSUs) 710, edge computing servers in the edge network 800, and wireless or wired connections among the respective RSUs 710. As illustrated, the RSUs 710 have content storage (CS) 712 for caching incoming data packets and maintain a routing table (Forwarding Information Base (FIB)) 714 to store the outgoing interfaces and a Pending Interest Table (PIT) 716 to keep track of the forwarded interests as in the example ICN of FIG. 1. The RSUs 710 as so configured function as a virtual agent for the vehicles 700 to perform ICN functions in the following manner.

When a vehicle 700 wants to fetch a piece of content it sends an interest packet to an RSU 710 in a unicast communication channel with acknowledgement capability. The interest packet may include the vehicle's spatial information (speed, heading, location, etc.) to enable the RSU 710 to make context aware forwarding and routing decisions. When the RSU 710 receives the interest packet it checks in its content storage (CS) first. If the content is available in CS or is stored on an edge computing server in edge network 800, the content may be sent to the vehicle 700. Otherwise, the RSU 710 forwards the interest packet within the edge network 800 based on the context of the vehicle 700 (e.g., spatial information, lifespan of information, etc.) and the requested content. In some scenarios, the RSU 710 would multicast those interest packets to the vehicles 700 in its coverage using transmitters 718 as well. The RSU 710 would update FIB tables 714 and PIT tables 716 accordingly. The RSU 710 also would check whether there are any other similar interest packets from other vehicles that could be merged.

The RSU 710 may also check whether the interest packet needs to be split into multiple interest packets based on the requested content before forwarding. Based on the vehicle speed and the other parameters provided, the RSU 710 that received the interest packet may not be able to deliver the content to the vehicle 710 due to the speed and direction of the vehicle 700. The RSU 710 would include the context aware routing information in the interest packet before forwarding.

The vehicle 700 and the RSU 710 may also include the lifespan of interest in the interest packets. In other words, the requested content may be identified as useful only within the lifespan of interest time period as, for example, that time period during which the vehicle 700 is in range for a broadcast. The RSU 710 and edge network 800 would handle the interest packets with some predefined priority levels. For example, the temporal information would have higher priority than spatial information.

If the RSU 710 receives multiple contents for an interest packet, the RSU 710 may combine the contents before sending the contents to the vehicle 700. For example, in the case of vehicle requested LiDAR point cloud of an intersection, the RSU 710 may forward the interest packet and received point clouds from multiple sources. In such as case, the RSU 710 would combine the received point clouds before forwarding them to the vehicle 700.

On the other hand, when the content generating vehicles create content, the content generating vehicles may forward the content to the RSU 710 for caching at an edge server of the edge network 800. For example, a LiDAR point cloud or camera images may be cached at an edge server of the edge network 800. The vehicles 700 may also add lifespan of information to the content so stored. When the content generating vehicles 700 detect some anomaly in the field of view, the vehicles 700 may also forward data representing the anomaly to the RSU 710 for caching at the edge server of the edge network 800. For example, a LiDAR point cloud or camera images of a road hazard may be time stamped and cached at the edge server of the edge network 800.

When a RSU 710 receives the interest packet forwarded by another RSU 710, the receiving RSU 710 would do the following:
1. It would check spatial context information in the interest packet to determine whether the content is from its content storage (CS) 712 or from the vehicles 700 in its coverage.
2. If the content is not requested from the particular RSU 710, the particular RSU 710 would forward the interest packet to another RSU 710 based on the spatial context.
3. If the content is requested from the RSU 710, is available in its CS 712, and the lifespan of interest and lifespan of information have not expired, the RSU 710 would forward the content.
4. If the lifespan of interest is not expired and content is not available, or the lifespan of information is expired, the RSU 710 would broadcast/multicast the interest packet to vehicles 700 in its coverage area to fetch the content.

The RSUs 710 thus function as an orchestrator of the type described above with respect to FIG. 6 and can also help a heterogeneous network with different radio interfaces when all nodes/devices do not have the same radio. It may be assumed that at least some RSUs 710 have dual/multiple radio stacks that can receive on one radio and then inform other vehicles on another radio(s). If there is no dual radio node present, a gateway with a dual radio may be used. The RSUs 710 may coordinate and select a few RSUs 710 with multiple radios and consider this information for context aware routing.

However, when all RSUs 710 do not have ICN capability or support, it may be assumed that at least some RSUs 710 have dual protocol stacks (ICN and IP co-existing with a convergence layer between the APP Layer and the ICNIP Layer) support, so that these nodes can receive data on one stack and then inform other users on another stack. If there are no dual protocol stack nodes, a gateway with dual protocol stacks may be used. The RSUs 710 so configured may coordinate and select a few leaders with dual protocol stacks (ICN and IP co-existing) support and use the information in the context aware routing as described herein.

Estimating Round-Trip Delays in ICN

In traditional TCP/IP networks, the nature of fixed endpoints allows a more granular estimate of the round-trip time between endpoints. This allows the development of sophisticated congestion control and flow-control algorithms to adapt the transmission rates. Existing protocols such as TCP utilize an exponentially-weighted moving average of previously-experienced RTT delays. However, this only works if the data is received from the same sender (over possibly multiple routes). In other words, if the data arrives from different senders at different times, the weighted averaging cannot work effectively. Due to the data-centric and location-agnostic nature of ICN, some packets may come from close by and others may arrive from further away, thus making it hard to develop algorithms for congestion control and flow control, specifically, to set the rate at which interest packets are sent out. It is further desired to estimate round-trip delay in ICN with a reasonable accuracy which can be utilized in developing routing techniques including efficient adaptive transmission methods such as congestion control, flow control, among others.

Methods to estimate RTT delays at a consumer node in an information-centric network are provided that allow caching of contents at intermediate nodes/routers. The problem addressed is complex since fragments of the same data can originate from different locations causing a high variance in the round-trip time. The methods thus approximate the data retrieval problem as an analogue of retrieving data from different levels of cache memory versus main memory in a CPU. The methods described herein may then systematically evaluate the content movement in the cache in order to estimate the probability of data availability at different cache levels using analysis and machine learning approaches.

Estimating round-trip time (RTT) delays in an information-centric network has several benefits such as adaptive rate control, admission control, etc. The methods described herein are based on partitioning the content source into fixed quantized levels that allow scalable estimation of RTT delays based on historical information. Further, machine learning based approaches may be applied that use the rich availability of training data based on past {content, RTT} pairings to fit new RTT estimates.

Figure 9:
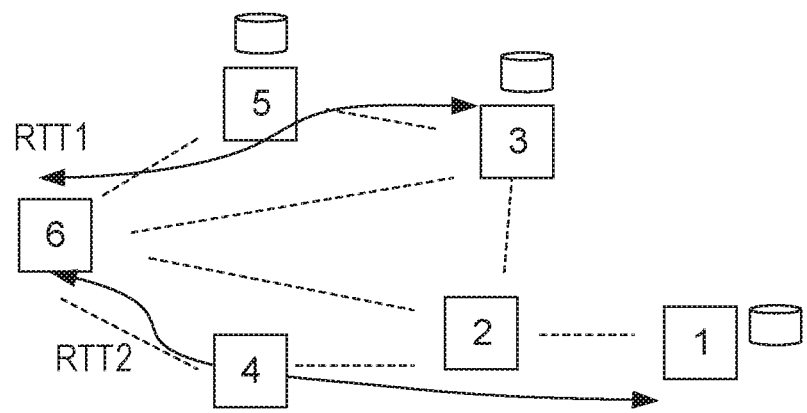
FIG. 9 illustrates that content can be accessed from different nodes in ICN leading to different round-trip times (RTTs).

As noted above, an estimation of round-trip delay in an ICN network is fundamentally challenging given that the RTT varies largely over time due to the possibility of data arriving to the consumer from different locations. For example, FIG. 9 illustrates that content can be accessed from different nodes 1 and 3 in ICN leading to different RTTs via nodes 3 and 5 (RTT1) and nodes 1, 2, and 4 (RTT2). However, some observations may be made given the nature of caching in the network.

For example, in a base approach, if the delay to the producer/publisher can be estimated, it should be the upper bound on the delay in the interest rate adaptation. To estimate this delay, a record of the maximum delay up to that point is kept and it is assumed to be the delay to the producer. A moving window of RTT delays until the current time can be maintained to update the maximum delay estimate. This could be the base value of RTT estimate in the absence of the methods described herein and may reduce any variational error. Clustering, averaging or other techniques can be used to smooth out irregularities and remove outliers. Further, the hop counts at different times can be recorded that allow the creation of an estimate of the RTT.

As another example, the RTT may be calculated based on history. For any given content, the best-case scenario is when the consumer gets the content from a neighboring node (can be termed as L1 cache). On the flip side, the farthest the data can be received from would be the producer (assuming a unique producer). The cache locations may be partitioned to N quantized levels where each level has a certain distinct average RTT. Historical information can then be utilized to determine the cache hit probability for each of the cache levels. This is explained more clearly below.

The estimated RTT at time t can be determined as $RTT_{est}(t)=P*RTT$, where:
$P=[p_1, \ldots p_N]$ is the vector of the probability of a cache hit at levels $i=1, \ldots, N$ and $\Sigma p_i=1$; and
$RTT=[RTT_1, \ldots, RTT_N]$ is the vector of round-trip times from the consumer to level $i=1, \ldots, N$.
The goal is to determine the cache hit probability vector P for a given {consumer, content} tuple and to update it.

In sample embodiments, the cache hit probabilities are computed periodically at the consumer. The consumer collects the RTT time reports for several of the past transmissions and maintains quantized cache level abstractions, each of the levels indicating a certain range of RTTs. For these quantized RTT intervals, the controller/consumer computes the probability mass function of a successful cache hit which is stored as P. At each periodic interval, the consumer/controller can remove some of the older RTT values recorded from the calculation of the probability mass function (pmf). Alternatively, a moving window can be utilized that selects the past RTT values to be used for calculating the $RTT_{est}(t)$. This data can be primarily collected at the consumer node to adjust the rate of sending interest packets. However, the same methodology can also be utilized by the master controller to have an estimate of the RTT corresponding to each node in the network.

In another sample embodiment, a machine learning based estimate of RTT may be obtained by utilizing a regression model (linear or polynomial) to fit the historical RTT values given a set of features at the consumer such as the content of interest, time of request, available next hop links, and so on. A trained regression model can then be utilized as a predictor for calculating the estimated RTT at any given time t.

Alternatively, several machine learning models such as regression are trained and used for predicting the components of the RTT function. One model can learn the probability of a content being cached, a model may determine the likelihood of the content to be demanded in the neighborhood (if many consumers are interested in the same content in the vicinity, then it is more likely for the content to be cached nearby), and a model may predict how busy the network is/will be in a period of time. The RTT can be then a function of demand, caching, and traffic.

In another example, a poke and probe approach may be utilized whereby a node is trying to learn the RTT function for a given content by trying and testing (actual measures) of the network RTT. Because this will be a task of learning a function of the behavior of the network, a reinforcement learning method fits well for the task. In this case, the historic information is useful to determine traffic patterns or network behavior for certain types of traffic.

In yet another example, Bayesian learning techniques may be utilized to calculate the cache hit probability as more historical information becomes available. Also, the maximum likelihood of the RT can be calculated. This is especially useful if the typical cache locations and the RTT for those caches (and the producer) are known a priori.

Machine Learning Techniques for Optimizing the FIB

As noted above, next hop determination is a challenging problem. Existing solutions flood the interests that cause unnecessary overhead in the network. Also, in dynamic networks, such as vehicular networks, the next hop is not static and needs to be adaptively updated. Moreover, the size of the FIB can be restricted due to storage limitations depending on the node (e.g., sensor nets, IoT networks with small devices, etc.).

Typically, interests are flooded on all interfaces and the one with the lowest latency to respond is retained. There are name-based routing protocols which use special advertisement packets to discover routes. The FIB also has one entry for every new interest/source-destination pair, and older entries are flushed out to fit newer entries in the FIB based on the freshness value. However, flooding causes overhead. Dynamic network changes and FIB updating is not efficient. The size of the FIB also can be an issue in small node networks and one entry per <prefix, next-hop> pair may not be efficient.

Machine learning techniques are used to adaptively determine the next hop of an input interest packet based on features extracted from the packet. The FIB can be thought of as a function mapping interest packets to destination pairs and hence common features can be used to map the prefix to the next hop without having an explicit entry for every input. Such an approach provides efficient forwarding and potentially faster adaptation to dynamic changes in the network as well as a compressed FIB table.

Next-Hop Determination in a FIB

Figure 10:
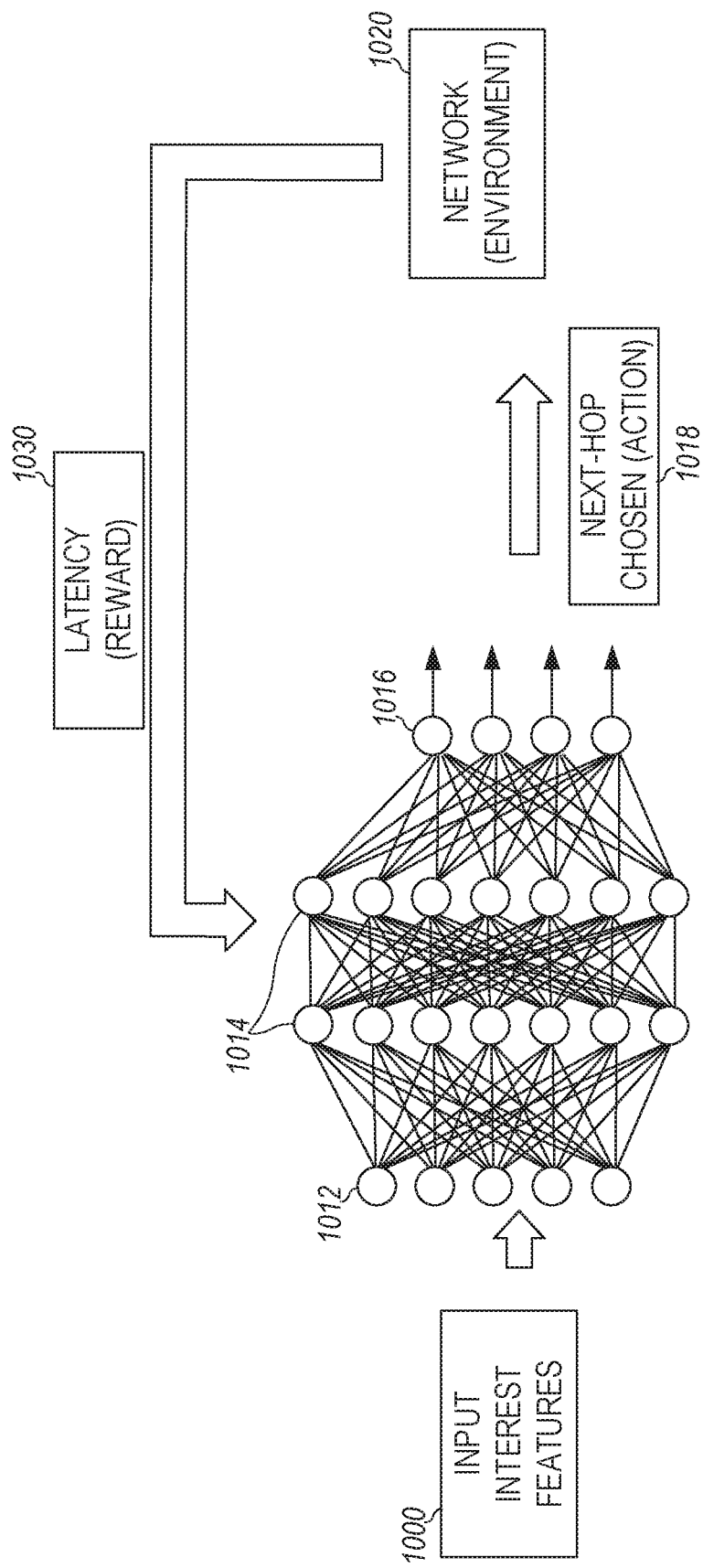
FIG. 10 illustrates an example where the next-hop determination in a FIB is cast as a reinforcement learning problem.

Next-hop determination in a FIB can be cast as a reinforcement learning problem and, in particular, as a Deep Reinforcement Learning problem given the varied nature of the input features that need to be used and the complexity of the problem. FIG. 10 illustrates a next-hop determination in a FIB cast as a reinforcement learning problem. As illustrated, the input interest features 1000 are applied to a neural network 1010 including an input layer 1012, a hidden layer 1014, and an output layer 1016 that choses a next hop at 1018 for application to the network environment 1020. The resulting latency 1030 as a result of application of the chosen next hop 1018 to the network environment 1020 is fed back to the neural network to train the neural network 1010 in a conventional manner.

The state of the system illustrated in FIG. 10 is defined by the input interest packet. Features are extracted out of this interest packet and fed to the network as input interest features 1000. An example set of features includes but is not limited to a packet header, Media Access Control (MAC) and link level addresses of a previous hop, geographic location, a neighbor list and their link qualities, producer hints provided in the interest header, a quality of service (QoS) requirement, content validation time, past FIB entries, and the past history of all of these features. Further examples of network specific input interest features 1000 may be provided based on the type of network and the actions/rewards 1030 to be applied to the network 1020.

For example, in a vehicular network of the type described with respect to FIG. 7, if the interest packet is for geolocation associated content (such as request for an intersection HD map, specific parking lot info, etc.), the content location, consumer location, node's own location, road map/topology, neighbor-nodes location/direction/link qualities can also be used to determine the next hop.

The domain of actions A is the set of output interfaces on which the interest packet could be sent out. This could be just one of the many output interfaces, all of the interfaces (flooding), or all possible subsets of the interfaces. The domain of actions A can be parametrized as the weights of the neural network with the output being the set of possible actions. So, the goal is to optimize in the weights domain.

The reward R that is observed is the latency reduction, Successful Cache/Content Finding percentage, Cache/Content hit success in case of producer mobility or network topology change, cost of forwarding (power and computations), drop in RTT by the requester, and other QoS parameters of the data response that is received from the network. Various exploration and exploitation principles can be explored. For example, flooding is an extreme case of exploration whereas sending it on the best interface estimated at the previous time instant is the other extreme.

If V is defined to be the loss function that needs to be minimized over time, V is a function of the rewards as well as the loss through exploitation L by not sending out the packets on the best interface at any given point of time. If w are the weights of the neural network, then the optimization problem can be formulated as:

$$\min_{w} E(V(R, L))$$

In many networks, different nodes have different levels of resources. Some may possibly store a FULL-FIB-Table, while others can use a learning based next-hop determination. FULL-FIB-Table nodes share the burden to ensure that the interest packet is forwarded correctly if it finds a learning based next-hop selection by its neighbor is not an optimal path (under the assumption that whenever an interest packet is forwarded to the next-hop, the FULL-FIB-Table neighbor nodes can read it). A higher weight or reward for selecting FULL-FIB-Table node may also be given as the next-hop by the learning algorithm. On the other hand, for a delay sensitive interest packet, one can bias the learning algorithm to select FULL-FIB-Table neighbors. By a discovery message exchange, nodes may have knowledge of FULL-FIB-Table neighbors. For example, a learning-based algorithm of a node may choose a wrong/sub-optimal next hop. In such as case, the task of the FULL-FIB-Table node is to overhear forwarded interest packets from neighbor nodes and to forward the interest packet to the optimal next-hop if it finds that some neighbors' learning based algorithm has selected the wrong/sub-optimal next-hop.

For delay sensitive traffic it may be possible that the learning algorithm is executed proactively on dummy interest packets to determine the optimal routes. The learning algorithm could also use data from inbound data paths for different interests to proactively optimize. The latency per-hop could be another metric that can be used which is independent of the routes for a specific interest. When the interest packet reaches the producer, a special interest packet could be generated that notifies that latency per-hop to all its neighbors. For delay sensitive traffic, the algorithm can be dynamically executed as and when interests arrive.

FIB Compression Using a ML Based Approach

A next-hop determination policy may be provided that is based on the approach mentioned above or any other standard approach. A FIB table may be provided that has entries mapping interest packets to their next-hops. A single entry may have multiple next-hops for reliability. In sample embodiments, the FIB table may be replaced with a function that maps the input interests to the next-hops. For example, FIG. 11 illustrates a FIB table 1100 that has entries 1110 mapping interest packets to their next-hops that may be replaced with a function 1120 that maps the input interests to the next-hops by mapping the input interest features 1130 to the next-hop 1140.

Figure 11:
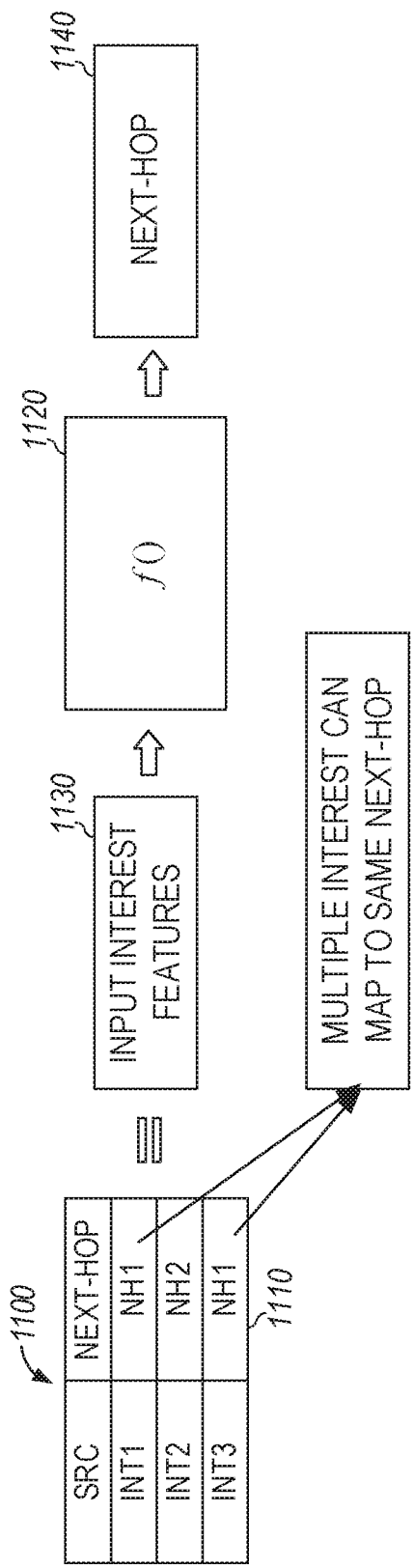
FIG. 11 illustrates an example where a FIB table that has entries mapping interest packets to their next-hops may be replaced with a function that maps the input interests to the next-hops.

The function 1120 illustrated in FIG. 11 could be parametrized by any ML algorithm including, for example, a Deep Neural Network. The size of the ML algorithm used may be determined by the complexity restrictions on the node. The goal is to replace a memory lookup table with a parametric function of the same complexity but with a larger effective "mapping" capability. The input interest features 1130 to the function 1120 may be some features of the input packet as discussed above or just the header (the Deep Neural Network can extract relevant features automatically from this). The function 1120 thus needs to identify the inherent structure of the FIB 1100. The function 1120 may be trained offline by large simulations with no training in the evaluation phase if the nodes have limited computation capability. The function 1120 may also be trained in an online manner to capture the inherent characteristics of the network in which it is implemented. In this case, it is possible that the nodes send some features, the function parameters and the some of the FIB entries to an edge server that could perform the computations for the nodes and transmit back the updated function parameters to these nodes. Additionally, the flooding/multicasting that is inherent in the system (the broadcast messages have to be sent initially anyway) may also be leveraged upon as an initial training opportunity for the neural network.

It will be appreciated that the machine learning techniques described herein may be used to reduce FIB size especially for resource constrained devices. It will be further appreciated that the solution requires on-device computing or inference which is feasible on smart IoT devices. It will be further appreciated that the techniques described herein can also be extended to a multi-node scenario. The problem can also be formulated as a multi-agent Deep Reinforcement Learning problem where the training can also be done jointly among multiple routers in an offline manner and a central entity can update the weights of a global Reinforcement Learning model. The goal will then be to maximize the aggregate rewards or minimizing an Nth order moment of the aggregate cost from all agents (each agent being a router).

It will be further appreciated that the techniques described herein for providing routing updates, context aware forwarding, RTT estimation, and machine learning techniques for optimizing/compressing a FIB may be implemented independently or combined in a variety of combinations to provide a more efficient ICN for a variety of cellular and general networking applications. In sample embodiments, the ICN would be adapted to include the features appropriate for the particular networking application.

Computing Architecture

Figure 12:
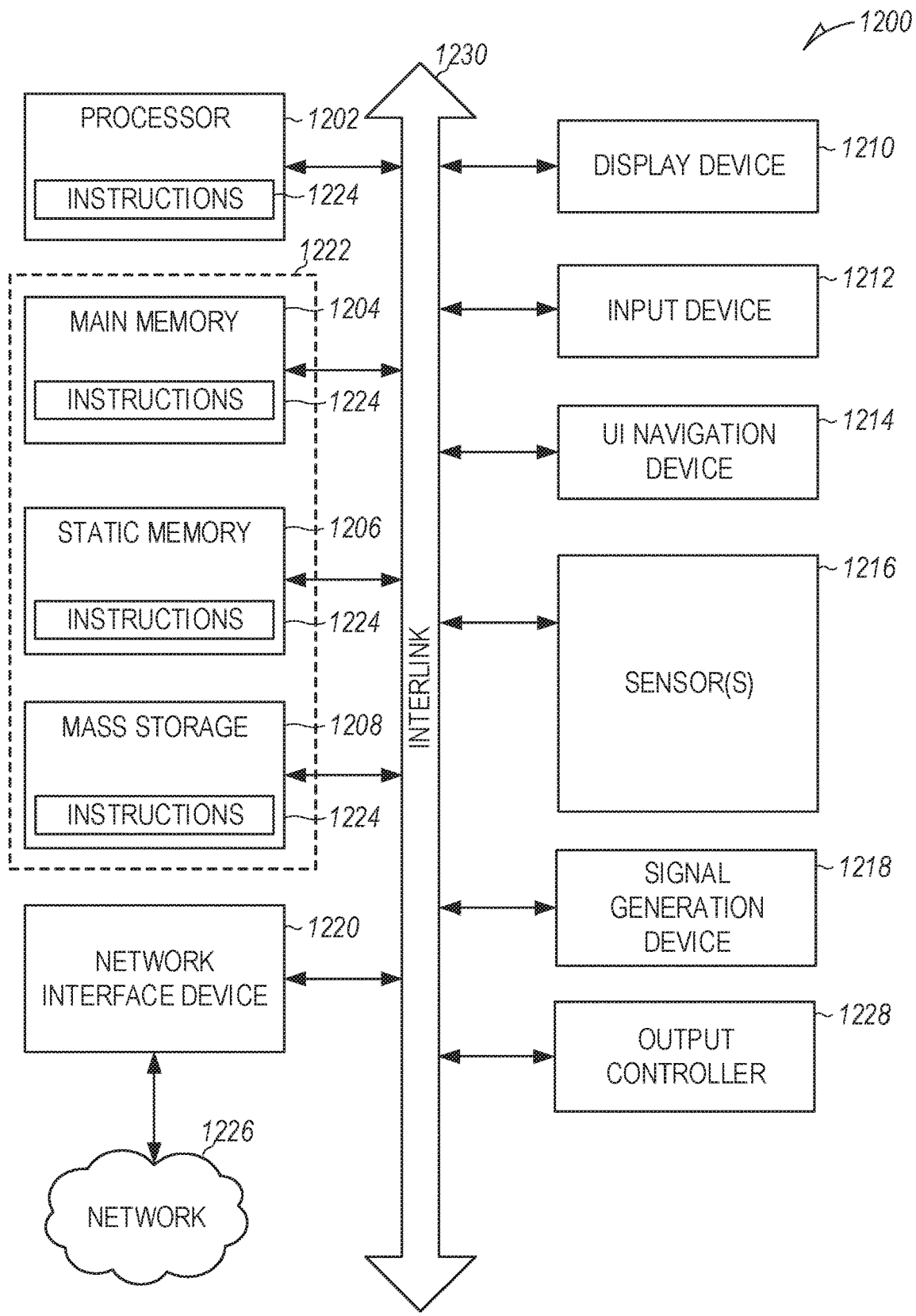
FIG. 12 is a block diagram illustrating an example of a machine upon which one or more embodiments may be implemented.

FIG. 12 illustrates a block diagram of an example machine 1200 upon which any one or more of the techniques (e.g., methodologies) discussed herein may perform. Examples, as described herein, may include, or may operate by, logic or a number of components, or mechanisms in the machine 1200. Circuitry (e.g., processing circuitry) is a collection of circuits implemented in tangible entities of the machine 1200 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 1200 follow.

In alternative embodiments, the machine 1200 may operate as a standalone device or may be connected (e.g., networked) to other machines. In a networked deployment, the machine 1200 may operate in the capacity of a server machine, a client machine, or both in server-client network environments. In an example, the machine 1200 may act as a peer machine in peer-to-peer (P2P) (or other distributed) network environment. The machine 1200 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1200 may include a hardware processor 1202 (e.g., a central processing unit (CPU), a graphics processing unit (GPU), a hardware processor core, or any combination thereof), a main memory 1204, a static memory (e.g., memory or storage for firmware, microcode, a basic-input-output (BIOS), unified extensible firmware interface (UEFI), etc.) 1206, and mass storage 1208 (e.g., hard drive, tape drive, flash storage, or other block devices) some or all of which may communicate with each other via an interlink (e.g., bus) 1230. The machine 1200 may further include a display unit 1210, an alphanumeric input device 1212 (e.g., a keyboard), and a user interface (UI) navigation device 1214 (e.g., a mouse). In an example, the display unit 1210, input device 1212 and UI navigation device 1214 may be a touch screen display.

The machine 1200 may additionally include a storage device (e.g., drive unit) 1208, a signal generation device 1218 (e.g., a speaker), a network interface device 1220, and one or more sensors 1216, such as a global positioning system (GPS) sensor, compass, accelerometer, or other sensor. The machine 1200 may include an output controller 1228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1202, the main memory 1204, the static memory 1206, or the mass storage 1208 may be, or include, a machine readable medium 1222 on which is stored one or more sets of data structures or instructions 1224 (e.g., software) embodying or utilized by any one or more of the techniques or functions described herein. The instructions 1224 may also reside, completely or at least partially, within any of registers of the processor 1202, the main memory 1204, the static memory 1206, or the mass storage 1208 during execution thereof by the machine 1200. In an example, one or any combination of the hardware processor 1202, the main memory 1204, the static memory 1206, or the mass storage 1208 may constitute the machine readable media 1222. While the machine readable medium 1222 is illustrated as a single medium, the term "machine readable medium" may include a single medium or multiple media (e.g., a centralized or distributed database, and/or associated caches and servers) configured to store the one or more instructions 1224.

The term "machine readable medium" may include any medium that is capable of storing, encoding, or carrying instructions for execution by the machine 1200 and that cause the machine 1200 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1224 may be further transmitted or received over a communications network 1226 using a transmission medium via the network interface device 1220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1220 may include one or more physical jacks (e.g., Ethernet, coaxial, or phone jacks) or one or more antennas to connect to the communications network 1226. In an example, the network interface device 1220 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1200, and includes transitory digital or analog communications signals or other non-transitory intangible media to facilitate communication of such software. A transmission medium is a machine-readable medium.

Examples, as described herein, may include, or may operate on, processors, logic, or a number of components, modules, or mechanisms (herein "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. The software, when executed by the underlying hardware of the module, causes the hardware to perform the specified operations.

Accordingly, the term "module" is understood to encompass a tangible hardware and/or software entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Certain embodiments are described herein as numbered examples 1, 2, 3, etc. These numbered examples are provided as examples only and do not limit the subject technology. It will be appreciated the different embodiments may be implemented separately or in any proposed combination.

Example 1 is a computer-implemented method for maintaining information-centric network (ICN) route information between a first node and a second node in the ICN, comprising updating at least one ICN route segment between the first node and the second node using ICN control and management messages to provide routing information that maintains load balancing and reduces latency of content retrieval and signaling overhead among the first node, the second node, and any intermediate routers between the first node and the second node; finding a next hop node between the first node and the second node over the updated at least one ICN routing segment using the routing information; forwarding an interest packet from the first node to the next hop node; and sending an ICN control and management message to update an entry in a forwarding information base (FIB) at the next hop node to include an entry for at least the first node.

Example 2 is a method as in Example 1, further comprising exchanging the routing information among a distributed ICN routing control and management unit at the first node, a distributed ICN routing control and management unit at the second node, and at least one Centralized ICN Routing Coordination Unit controlled by a network operator, the at least one Centralized ICN Routing Coordination Unit dynamically optimizing and adjusting load balancing over the updated at least one ICN route segment.

Example 3 is a method as in any preceding example, further comprising exchanging routing information among the distributed ICN routing control and management unit at the first node and the second node, a distributed ICN routing control and management unit at at least one intermediate router between the first node and the second node in the updated at least one ICN route segment, and the at least one Centralized ICN Routing Coordination Unit controlled by the network operator, the at least one Centralized ICN Routing Coordination Unit dynamically optimizing and adjusting load balancing over the updated at least one ICN route segment.

Example 4 is a method as in any preceding example, wherein exchanging routing information between the at least one Centralized ICN Routing Coordination Unit and the first node, the second node, and the at least one intermediate router comprises sending the routing information using ICN based communication or IP based communication on point-to-point communication links between the at least one Centralized ICN Routing Coordination Unit and the first node, the second node, and the at least one intermediate router.

Example 5 is a method as in any preceding example, wherein exchanging routing information between the at least one Centralized ICN Routing Coordination Unit and the first node, the second node, and the at least one intermediate router comprises sending a routing information table from the at least one Centralized ICN Routing Coordination Unit to the first node, the second node, and the at least one intermediate router.

Example 6 is a method as in any preceding example, further comprising the at least one Centralized ICN Routing Coordination Unit selecting a first updated ICN route segment and a second updated ICN route segment between the first node and the second node, the first updated ICN route segment being selected for transmitting latency sensitive content and the second updated ICN route segment being selected for transmitting high data rate latency tolerant content.

Example 7 is a method as in any preceding example, further comprising providing a Centralized ICN Routing Coordination Unit for respective geographic areas of the ICN.

Example 8 is a method as in any preceding example, wherein sending the ICN control and management message to update the entry in the FIB at the next hop comprises adding an entry in the FIB of the next hop node that identifies the first node and the second node.

Example 9 is a method as in any preceding example, wherein updating at least one ICN route segment between the first node and the second node using ICN control and management messages to provide routing information comprises a distributed ICN routing control and management unit at the first node flooding an ICN-Route-Discovery-Request over multiple ICN route segments between the first node and the second node and a distributed ICN routing control and management unit at the second node selecting one of the ICN route segments and responding to the ICN-Route-Discovery-Request by sending a unicast Route-Discovery-Response to the first node over the selected one of the ICN route segments.

Example 10 is a method as in any preceding example, further comprising receiving a named data function networking (NFN) execution plan that predicts popularity of respective nodes, using the NFN execution plan to predict popularity of nodes in the ICN, selecting nodes in the ICN as the first node and the second node that are predicted by the NFN execution plan to have a higher popularity than non-selected nodes in the ICN, and informing a central router to perform east-west predictive routing of data between the first node and the second node where data and function interests in the ICN are satisfied using a most efficient routing strategy given popularity predictions informed by the NFN execution plan.

Example 11 is a method as in any preceding example, wherein the first node is located in a vehicle and the second node is located in a vehicular network, wherein forwarding the interest packet from the first node to the next hop node comprises sending the interest packet to a road side unit or infrastructure node with context aware data in a unicast communication channel.

Example 12 is a method as in any preceding example, wherein the context aware data comprises at least one of the vehicle's speed, heading, and location.

Example 13 is a method as in any preceding example, further comprising performing context aware caching and routing at the road side unit or infrastructure node based on at least one of location of the vehicle, lifespan of information in the interest packet, and a density of vehicles in the vehicular network.

Example 14 is a method as in any preceding example, wherein routing at the road side unit or infrastructure node comprises checking a local storage for content requested by the interest packet and sending the content to the vehicle.

Example 15 is a method as in any preceding example, wherein when the local storage does not include the requested content, forwarding the interest packet to another node in the updated at least one ICN routing segment based on the context aware data and requested content, and updating the FIB at the road side unit or infrastructure node.

Example 16 is a method as in any preceding example, wherein forwarding the interest packet to another node in the updated at least one ICN routing segment comprises prioritizing the interest packet relative to other interest packets based on at least one of temporal information and spatial information in the context aware data.

Example 17 is a method as in any preceding example, wherein the at least one ICN route segment comprises at least one intermediate node having a data cache, further comprising calculating a round-trip time (RTT) between the first node and the at least one intermediate node by partitioning the data cache into N quantized levels where each level has an average RTT, utilizing historical cache hit information to determine a cache hit probability for each of the N quantized levels, and adjusting a rate of sending interest packets by the first node based on a calculated RTT.

Example 18 is a method as in any preceding example, further comprising calculating a maximum delay estimate between the first node and the at least one intermediate node using a moving window of RTT delays between the first node and the at least one intermediate node until a current time can be maintained.

Example 19 is a method as in any preceding example, wherein utilizing the historical cache hit information to determine a cache hit probability for each of the N quantized levels comprises utilizing a machine learning model that has been trained to fit historical content and RTT pairings given a set of features at the first node to predict an estimated RTT at any given time.

Example 20 is a method as in any preceding example, wherein finding the next hop node between the first node and the second node over the updated at least one ICN routing segment using the routing information comprises extracting features from the interest packet including at least one of a packet header, Media Access Control (MAC) and link level addresses of a previous hop, geographic location, a neighbor list and neighbor link qualities, a quality of service requirement, content validation time, past FIB entries, and a past history of the extracted features, applying the extracted features to a neural network to select a next hop node, applying the selected next hop node to the ICN, feeding back as a reward R to the neural network at least one of observed latency, content finding percentage, content hit success, network topology change, cost of forwarding, drop in round-trip time (RTT), and quality of service parameters as a result of application of the selected hop node to the ICN, and minimizing, using an optimization E, a loss function V that is a function of R as well as a loss L resulting from not sending the interest packet to an optimal next hop node, where E is formulated as:

$$\min_{w} E(V(R, L))$$

and where w are weights of the neural network.

Example 21 is a method as in any preceding example, wherein finding the next hop node between the first node and the second node over the updated at least one ICN routing segment using the routing information comprises the FIB mapping the interest packet to at least one next hop node using a parametric function that maps input interests to next hop nodes.

Example 22 is a method as in any preceding example, wherein when a wrong or sub-optimal next hop has been selected, a FULL-FIB-Table node that monitors forwarded interest packets from neighbor nodes forwards the interest packet to an optimal next-hop.

Example 23 is an information-centric network (ICN) that maintains route information for forwarding interest packets through the ICN, comprising a first node in the ICN; a second node in the ICN; and a next hop node between the first node and the second node in the ICN, the next hop node comprising a forwarding information base (FIB), wherein the first node is adapted to perform operations comprising: updating at least one ICN route segment between the first node and the second node using ICN control and management messages to provide routing information that maintains load balancing and reduces latency of content retrieval and signaling overhead among the first node, the second node, and any intermediate routers between the first node and the second node; finding the next hop node over the updated at least one ICN routing segment using the routing information; forwarding an interest packet from the first node to the next hop node; and sending an ICN control and management message to update an entry in the forwarding information base (FIB) of the next hop node to include an entry for at least the first node.

Example 24 is an ICN as in Example 23, further comprising at least one Centralized ICN Routing Coordination Unit controlled by a network operator, wherein the first node is further adapted to perform operations comprising exchanging the routing information among a distributed ICN routing control and management unit at the first node, a distributed ICN routing control and management unit at the second node, and the at least one Centralized ICN Routing Coordination Unit controlled by a network operator, the at least one Centralized ICN Routing Coordination Unit dynamically optimizing and adjusting load balancing over the updated at least one ICN route segment.

Example 25 is an ICN as in Examples 23 and 24, further comprising a distributed ICN routing control and management unit at at least one intermediate router between the first node and the second node in the updated at least one ICN route segment, wherein the first node is further adapted to perform operations comprising exchanging routing information among the distributed ICN routing control and management unit at the first node and the second node, the distributed ICN routing control and management unit at at least one intermediate router between the first node and the second node in the updated at least one ICN route segment, and the at least one Centralized ICN Routing Coordination Unit controlled by the network operator, the at least one Centralized ICN Routing Coordination Unit dynamically optimizing and adjusting load balancing over the updated at least one ICN route segment.

Example 26 is an ICN as in Examples 23-25, wherein the first node exchanges routing information between the at least one Centralized ICN Routing Coordination Unit, the first node, the second node, and the at least one intermediate router by sending the routing information using ICN based communication or IP based communication on point-to-point communication links between the at least one Centralized ICN Routing Coordination Unit and the first node, the second node, and the at least one intermediate router.

Example 27 is an ICN as in Examples 23-26, wherein the first node exchanges routing information between the at least one Centralized ICN Routing Coordination Unit, the first node, the second node, and the at least one intermediate router by sending a routing information table from the at least one Centralized ICN Routing Coordination Unit to the first node, the second node, and the at least one intermediate router.

Example 28 is an ICN as in Examples 23-27, wherein the at least one Centralized ICN Routing Coordination Unit selects a first updated ICN route segment and a second updated ICN route segment between the first node and the second node, the first updated ICN route segment being selected for transmitting latency sensitive content and the second updated ICN route segment being selected for transmitting high data rate latency tolerant content.

Example 29 is an ICN as in Examples 23-28, further comprising a Centralized ICN Routing Coordination Unit for each respective geographic area of the ICN.

Example 30 is an ICN as in Examples 23-29, wherein the first node sends the ICN control and management message to update the entry in the FIB at the next hop by adding an entry in the FIB of the next hop node that identifies the first node and the second node.

Example 31 is an ICN as in Examples 23-30, the first node further comprising a distributed ICN routing control and management unit and the second node comprising a distributed ICN routing control and management unit, wherein the first node updates at least one ICN route segment between the first node and the second node using ICN control and management messages to provide routing information by the distributed ICN routing control and management unit flooding an ICN-Route-Discovery-Request over multiple ICN route segments between the first node and the second node and the distributed ICN routing control and management unit selects one of the ICN route segments and responds to the ICN-Route-Discovery-Request by sending a unicast Route-Discovery-Response to the first node over the selected one of the ICN route segments.

Example 32 is an ICN as in Examples 23-31, wherein the first node further receives a named data function networking (NFN) execution plan that predicts popularity of respective nodes and uses the NFN execution plan to predict popularity of nodes in the ICN, selects nodes in the ICN as the first node and the second node that are predicted by the NFN execution plan to have a higher popularity than non-selected nodes in the ICN, and informs a central router to perform east-west predictive routing of data between the first node and the second node where data and function interests in the ICN are satisfied using a most efficient routing strategy given popularity predictions informed by the NFN execution plan.

Example 33 is an ICN as in Examples 23-32, wherein the first node is located in a vehicle and the second node is located in a vehicular network, further comprising a road side unit or infrastructure node, wherein the first node forwards the interest packet to the next hop node by sending the interest packet to the road side unit or infrastructure node with context aware data in a unicast communication channel.

Example 34 is an ICN as in Examples 23-33, wherein the context aware data comprises at least one of the vehicle's speed, heading, and location.

Example 35 is an ICN as in Examples 23-34, wherein the road side unit or infrastructure node performs context aware caching and routing based on at least one of location of the vehicle, lifespan of information in the interest packet, and a density of vehicles in the vehicular network.

Example 36 is an ICN as in Examples 23-35, further comprising a local storage that stores content, wherein the road side unit or infrastructure node routes data by checking the local storage for content requested by the interest packet and sending the content to the vehicle.

Example 37 is an ICN as in Examples 23-36, wherein when the local storage does not include the requested content, the first node forwards the interest packet to another node in the updated at least one ICN routing segment based on the context aware data and requested content and updates the FIB at the road side unit or infrastructure node.

Example 38 is an ICN as in Examples 23-37, wherein the first node, road side unit or infrastructure node forwards the interest packet to another node in the updated at least one ICN routing segment by prioritizing the interest packet relative to other interest packets based on at least one of temporal information and spatial information in the context aware data.

Example 39 is an ICN as in Examples 23-38, wherein the at least one ICN route segment comprises at least one intermediate node having a data cache, and wherein the first node calculates a round-trip time (RTT) between the first node and the at least one intermediate node by partitioning the data cache into N quantized levels where each level has an average RTT, utilizes historical cache hit information to determine a cache hit probability for each of the N quantized levels, and adjusts a rate of sending interest packets by the first node based on a calculated RTT.

Example 40 is an ICN as in Examples 23-39, wherein the first node further calculates a maximum delay estimate between the first node and the at least one intermediate node using a moving window of RTT delays between the first node and the at least one intermediate node until a current time can be maintained.

Example 41 is an ICN as in Examples 23-40, further comprising a machine learning model that has been trained to fit historical content and RTT pairings given a set of features at the first node, wherein the first node utilizes the historical cache hit information to determine a cache hit probability for each of the N quantized levels by using the machine learning model to predict an estimated RTT at any given time.

Example 42 is an ICN as in Examples 23-41, wherein the first node finds the next hop node between the first node and the second node over the updated at least one ICN routing segment using the routing information by extracting features from the interest packet including at least one of a packet header, Media Access Control (MAC) and link level addresses of a previous hop, geographic location, a neighbor list and neighbor link qualities, a quality of service requirement, content validation time, past FIB entries, and a past history of the extracted features, applying the extracted features to a neural network to select a next hop node, applying the selected next hop node to the ICN, feeding back as a reward R to the neural network at least one of observed latency, content finding percentage, content hit success, network topology change, cost of forwarding, drop in round-trip time (RTT), and quality of service parameters as a result of application of the selected hop node to the ICN, and minimizing, using an optimization E, a loss function V that is a function of R as well as a loss L resulting from not sending the interest packet to an optimal next hop node, where E is formulated as:

$$\min_{w} E(V(R, L))$$

and where w are weights of the neural network.

Example 43 is an ICN as in Examples 23-42, wherein the FIB maps the interest packet to at least one next hop node using a parametric function that maps input interests to next hop nodes.

Example 44 is an ICN as in Examples 23-43, further comprising a FULL-FIB-Table node that monitors forwarded interest packets from neighbor nodes and forwards the interest packet to an optimal next-hop when a wrong or sub-optimal next hop has been selected.

Example 45 is a non-transitory computer-readable medium comprising instructions that when executed by a processor cause the processor to perform operations for maintaining information-centric network (ICN) route information between a first node and a second node in the ICN, the operations comprising: updating at least one ICN route segment between the first node and the second node using ICN control and management messages to provide routing information that maintains load balancing and reduces latency of content retrieval and signaling overhead among the first node, the second node, and any intermediate routers between the first node and the second node; finding a next hop node between the first node and the second node over the updated at least one ICN routing segment using the routing information; forwarding an interest packet from the first node to the next hop node; and sending an ICN control and management message to update an entry in a forwarding information base (FIB) at the next hop node to include an entry for at least the first node.

Example 46 is a medium as in Example 45, further comprising instructions that when executed by the processor cause the processor to perform operations including exchanging the routing information among a distributed ICN routing control and management unit at the first node, a distributed ICN routing control and management unit at the second node, and at least one Centralized ICN Routing Coordination Unit controlled by a network operator, the at least one Centralized ICN Routing Coordination Unit dynamically optimizing and adjusting load balancing over the updated at least one ICN route segment.

Example 47 is a medium as in Examples 45 and 46, further comprising instructions that when executed by the processor cause the processor to perform operations including exchanging routing information among the distributed ICN routing control and management unit at the first node and the second node, a distributed ICN routing control and management unit at at least one intermediate router between the first node and the second node in the updated at least one ICN route segment, and the at least one Centralized ICN Routing Coordination Unit controlled by the network operator, the at least one Centralized ICN Routing Coordination Unit dynamically optimizing and adjusting load balancing over the updated at least one ICN route segment.

Example 48 is a medium as in Examples 45-47, wherein the instructions for exchanging routing information between the at least one Centralized ICN Routing Coordination Unit and the first node, the second node, and the at least one intermediate router comprises instructions for sending the routing information using ICN based communication or IP based communication on point-to-point communication links between the at least one Centralized ICN Routing Coordination Unit and the first node, the second node, and the at least one intermediate router.

Example 49 is a medium as in Examples 45-48, wherein the instructions for exchanging routing information between the at least one Centralized ICN Routing Coordination Unit and the first node, the second node, and the at least one intermediate router comprises instructions for sending a routing information table from the at least one Centralized ICN Routing Coordination Unit to the first node, the second node, and the at least one intermediate router.

Example 50 is a medium as in Examples 45-49, further comprising instructions that when executed by the processor cause the processor to perform operations including the at least one Centralized ICN Routing Coordination Unit selecting a first updated ICN route segment and a second updated ICN route segment between the first node and the second node, the first updated ICN route segment being selected for transmitting latency sensitive content and the second updated ICN route segment being selected for transmitting high data rate latency tolerant content.

Example 51 is a medium as in Examples 45-50, further comprising instructions that when executed by the processor cause the processor to perform operations including providing a Centralized ICN Routing Coordination Unit for respective geographic areas of the ICN.

Example 52 is a medium as in Examples 45-51, wherein the instructions for sending the ICN control and management message to update the entry in the FIB at the next hop comprises instructions for adding an entry in the FIB of the next hop node that identifies the first node and the second node.

Example 53 is a medium as in Examples 45-52, wherein the instructions for updating at least one ICN route segment between the first node and the second node using ICN control and management messages to provide routing information comprises instructions for flooding an ICN-Route-Discovery-Request over multiple ICN route segments between the first node and the second node and receiving a unicast Route-Discovery-Response over a selected one of the ICN route segments from a distributed ICN routing control and management unit at the second node.

Example 54 is a medium as in Examples 45-53, further comprising instructions that when executed by the processor cause the processor to perform operations including receiving a named data function networking (NFN) execution plan that predicts popularity of respective nodes, using the NFN execution plan to predict popularity of nodes in the ICN, selecting nodes in the ICN as the first node and the second node that are predicted by the NFN execution plan to have a higher popularity than non-selected nodes in the ICN, and informing a central router to perform east-west predictive routing of data between the first node and the second node where data and function interests in the ICN are satisfied using a most efficient routing strategy given popularity predictions informed by the NFN execution plan.

Example 55 is a medium as in Examples 45-54, wherein the first node is located in a vehicle and the second node is located in a vehicular network, wherein instructions for forwarding the interest packet from the first node to the next hop node comprises instructions for sending the interest packet to a road side unit or infrastructure node with context aware data in a unicast communication channel.

Example 56 is a medium as in Examples 45-55, wherein the context aware data comprises at least one of the vehicle's speed, heading, and location.

Example 57 is a medium as in Examples 45-56, further comprising instructions that when executed by the processor cause the processor to perform operations including performing context aware caching and routing at the road side unit or infrastructure node based on at least one of location of the vehicle, lifespan of information in the interest packet, and a density of vehicles in the vehicular network.

Example 58 is a medium as in Examples 45-57, wherein the instructions for routing at the road side unit or infrastructure node comprises instructions for checking a local storage for content requested by the interest packet and sending the content to the vehicle.

Example 59 is a medium as in Examples 45-58, further comprising instructions that when executed by the processor cause the processor to perform operations including forwarding the interest packet to another node in the updated at least one ICN routing segment based on the context aware data and requested content, and updating the FIB at the road side unit or infrastructure node when the local storage does not include the requested content.

Example 60 is a medium as in Examples 45-59, wherein the instructions for forwarding the interest packet to another node in the updated at least one ICN routing segment comprises instructions for prioritizing the interest packet relative to other interest packets based on at least one of temporal information and spatial information in the context aware data.

Example 61 is a medium as in Examples 45-60, wherein the at least one ICN route segment comprises at least one intermediate node having a data cache, further comprising instructions that when executed by the processor cause the processor to perform operations including calculating a round-trip time (RTT) between the first node and the at least one intermediate node by partitioning the data cache into N quantized levels where each level has an average RTT, utilizing historical cache hit information to determine a cache hit probability for each of the N quantized levels, and adjusting a rate of sending interest packets by the first node based on a calculated RTT.

Example 62 is a medium as in Examples 45-61, further comprising instructions that when executed by the processor cause the processor to perform operations including calculating a maximum delay estimate between the first node and the at least one intermediate node using a moving window of RTT delays between the first node and the at least one intermediate node until a current time can be maintained.

Example 63 is a medium as in Examples 45-62, wherein the instructions for utilizing the historical cache hit information to determine a cache hit probability for each of the N quantized levels comprises instructions for utilizing a machine learning model that has been trained to fit historical content and RTT pairings given a set of features at the first node to predict an estimated RTT at any given time.

Example 64 is a medium as in Examples 45-63, wherein the instructions for finding the next hop node between the first node and the second node over the updated at least one ICN routing segment using the routing information comprises instructions for extracting features from the interest packet including at least one of a packet header, Media Access Control (MAC) and link level addresses of a previous hop, geographic location, a neighbor list and neighbor link qualities, a quality of service requirement, content validation time, past FIB entries, and a past history of the extracted features, for applying the extracted features to a neural network to select a next hop node, for applying the selected next hop node to the ICN, for feeding back as a reward R to the neural network at least one of observed latency, content finding percentage, content hit success, network topology change, cost of forwarding, drop in round-trip time (RTT), and quality of service parameters as a result of application of the selected hop node to the ICN, and for minimizing, using an optimization E, a loss function V that is a function of R as well as a loss L resulting from not sending the interest packet to an optimal next hop node, where E is formulated as:

$$\min_{w} E(V(R, L))$$

and where w are weights of the neural network.

Example 65 is a medium as in Examples 45-64, wherein the instructions for finding the next hop node between the first node and the second node over the updated at least one ICN routing segment using the routing information comprises instructions for enabling the FIB to map the interest packet to at least one next hop node using a parametric function that maps input interests to next hop nodes.

Example 66 is an information-centric network (ICN) that maintains route information for forwarding interest packets through the ICN, comprising a first node in the ICN; a second node in the ICN; and a next hop node between the first node and the second node in the ICN, the next hop node comprising a forwarding information base (FIB), wherein the first node comprises means for updating at least one ICN route segment between the first node and the second node using ICN control and management messages to provide routing information that maintains load balancing and reduces latency of content retrieval and signaling overhead among the first node, the second node, and any intermediate routers between the first node and the second node; means for finding the next hop node over the updated at least one ICN routing segment using the routing information; means for forwarding an interest packet from the first node to the next hop node; and means for sending an ICN control and management message to update an entry in the forwarding information base (FIB) of the next hop node to include an entry for at least the first node.

Example 67 is an ICN as in Example 66, further comprising means for exchanging the routing information among a distributed ICN routing control and management unit at the first node, a distributed ICN routing control and management unit at the second node, and at least one Centralized ICN Routing Coordination Unit controlled by a network operator, the at least one Centralized ICN Routing Coordination Unit dynamically optimizing and adjusting load balancing over the updated at least one ICN route segment.

Example 68 is an ICN as in Examples 66 and 67, further comprising means for exchanging routing information among the distributed ICN routing control and management unit at the first node and the second node, a distributed ICN routing control and management unit at at least one intermediate router between the first node and the second node in the updated at least one ICN route segment, and the at least one Centralized ICN Routing Coordination Unit controlled by the network operator, the at least one Centralized ICN Routing Coordination Unit dynamically optimizing and adjusting load balancing over the updated at least one ICN route segment.

Example 69 is an ICN as in Examples 66-68, wherein the means for exchanging routing information between the at least one Centralized ICN Routing Coordination Unit and the first node, the second node, and the at least one intermediate router comprises means for sending the routing information using ICN based communication or IP based communication on point-to-point communication links between the at least one Centralized ICN Routing Coordination Unit and the first node, the second node, and the at least one intermediate router.

Example 70 is an ICN as in Examples 66-69, wherein the means for exchanging routing information between the at least one Centralized ICN Routing Coordination Unit and the first node, the second node, and the at least one intermediate router comprises means for sending a routing information table from the at least one Centralized ICN Routing Coordination Unit to the first node, the second node, and the at least one intermediate router.

Example 71 is an ICN as in Examples 66-70, wherein the at least one Centralized ICN Routing Coordination Unit selects a first updated ICN route segment and a second updated ICN route segment between the first node and the second node, the first updated ICN route segment being selected for transmitting latency sensitive content and the second updated ICN route segment being selected for transmitting high data rate latency tolerant content.

Example 72 is an ICN as in Examples 66-71, further comprising a Centralized ICN Routing Coordination Unit for each respective geographic area of the ICN.

Example 73 is an ICN as in Examples 66-72, wherein the means for sending the ICN control and management message to update the entry in the FIB at the next hop comprises means for adding an entry in the FIB of the next hop node that identifies the first node and the second node.

Example 74 is an ICN as in Examples 66-73, wherein the means for updating at least one ICN route segment between the first node and the second node using ICN control and management messages to provide routing information comprises a distributed ICN routing control and management unit at the first node including means for flooding an ICN-Route-Discovery-Request over multiple ICN route segments between the first node and the second node and a distributed ICN routing control and management unit at the second node including means for selecting one of the ICN route segments and responding to the ICN-Route-Discovery-Request by sending a unicast Route-Discovery-Response to the first node over the selected one of the ICN route segments.

Example 75 is an ICN as in Examples 66-74, further comprising means for receiving a named data function networking (NFN) execution plan that predicts popularity of respective nodes, means for using the NFN execution plan to predict popularity of nodes in the ICN, means for selecting nodes in the ICN as the first node and the second node that are predicted by the NFN execution plan to have a higher popularity than non-selected nodes in the ICN, and means for informing a central router to perform east-west predictive routing of data between the first node and the second node where data and function interests in the ICN are satisfied using a most efficient routing strategy given popularity predictions informed by the NFN execution plan.

Example 76 is an ICN as in Examples 66-75, wherein the first node is located in a vehicle and the second node is located in a vehicular network, wherein the means for forwarding the interest packet from the first node to the next hop node comprises means for sending the interest packet to a road side unit or infrastructure node with context aware data in a unicast communication channel.

Example 77 is an ICN as in Examples 66-76, wherein the context aware data comprises at least one of the vehicle's speed, heading, and location.

Example 78 is an ICN as in Examples 66-77, further comprising means for performing context aware caching and routing at the road side unit or infrastructure node based on at least one of location of the vehicle, lifespan of information in the interest packet, and a density of vehicles in the vehicular network.

Example 79 is an ICN as in Examples 66-78, wherein the means for routing at the road side unit or infrastructure node comprises means for checking a local storage for content requested by the interest packet and sending the content to the vehicle.

Example 80 is an ICN as in Examples 66-79, further comprising means for forwarding the interest packet to another node in the updated at least one ICN routing segment based on the context aware data and requested content and for updating the FIB at the road side unit or infrastructure node when the local storage does not include the requested content.

Example 81 is an ICN as in Examples 66-80, wherein the means for forwarding the interest packet to another node in the updated at least one ICN routing segment comprises means for prioritizing the interest packet relative to other interest packets based on at least one of temporal information and spatial information in the context aware data.

Example 82 is an ICN as in Examples 66-81, wherein the at least one ICN route segment comprises at least one intermediate node having a data cache, further comprising means for calculating a round-trip time (RTT) between the first node and the at least one intermediate node by partitioning the data cache into N quantized levels where each level has an average RTT, means for utilizing historical cache hit information to determine a cache hit probability for each of the N quantized levels, and means for adjusting a rate of sending interest packets by the first node based on a calculated RTT.

Example 83 is an ICN as in Examples 66-82, further comprising means for calculating a maximum delay estimate between the first node and the at least one intermediate node using a moving window of RTT delays between the first node and the at least one intermediate node until a current time can be maintained.

Example 84 is an ICN as in Examples 66-83, wherein the means for utilizing the historical cache hit information to determine a cache hit probability for each of the N quantized levels comprises means for utilizing a machine learning model that has been trained to fit historical content and RTT pairings given a set of features at the first node to predict an estimated RTT at any given time.

Example 85 is an ICN as in Examples 66-84, wherein the means for finding the next hop node between the first node and the second node over the updated at least one ICN routing segment using the routing information comprises means for extracting features from the interest packet including at least one of a packet header, Media Access Control (MAC) and link level addresses of a previous hop, geographic location, a neighbor list and neighbor link qualities, a quality of service requirement, content validation time, past FIB entries, and a past history of the extracted features, means for applying the extracted features to a neural network to select a next hop node, means for applying the selected next hop node to the ICN, means for feeding back as a reward R to the neural network at least one of observed latency, content finding percentage, content hit success, network topology change, cost of forwarding, drop in round-trip time (RTT), and quality of service parameters as a result of application of the selected hop node to the ICN, and means for minimizing, using an optimization E, a loss function V that is a function of R as well as a loss L resulting from not sending the interest packet to an optimal next hop node, where E is formulated as:

$$\min_{w} E(V(R, L))$$

and where w are weights of the neural network.

Example 86 is an ICN as in Examples 66-85, wherein the means for finding the next hop node between the first node and the second node over the updated at least one ICN routing segment using the routing information comprises means for enabling the FIB to map the interest packet to at least one next hop node using a parametric function that maps input interests to next hop nodes.

Example 87 is an ICN as in Examples 66-86, wherein when a wrong or sub-optimal next hop is selected, a FULL-FIB-Table node that monitors forwarded interest packets from neighbor nodes forwards the interest packet to an optimal next-hop.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A computer-implemented method for maintaining information-centric network (ICN) route information between a first node and a second node in the ICN, comprising:

updating at least one ICN route segment between the first node and the second node using ICN control and management messages to provide routing information that maintains load balancing and reduces latency of content retrieval and signaling overhead among the first node, the second node, and any intermediate routers between the first node and the second node, the at least one ICN route segment comprising at least one intermediate node having a data cache;
finding a next hop node between the first node and the second node over the updated at least one ICN routing segment using the routing information;
forwarding an interest packet from the first node to the next hop node;
sending an ICN control and management message to update an entry in a forwarding information base (FIB) at the next hop node to include an entry for at least the first node; and
calculating a round-trip time (RTT) between the first node and the at least one intermediate node by partitioning the data cache into N quantized levels where each level has an average RTT, utilizing historical cache hit information to determine a cache hit probability for each of the N quantized levels, and adjusting a rate of sending interest packets by the first node based on a calculated RTT.

2. The method of claim 1, further comprising exchanging the routing information among a distributed ICN routing control and management unit at the first node, a distributed ICN routing control and management unit at the second node, and at least one Centralized ICN Routing Coordination Unit controlled by a network operator, the at least one Centralized ICN Routing Coordination Unit dynamically optimizing and adjusting load balancing over the updated at least one ICN route segment.

3. The method of claim 2, further comprising exchanging routing information among the distributed ICN routing control and management unit at the first node and the second node, a distributed ICN routing control and management unit at at least one intermediate router between the first node and the second node in the updated at least one ICN route segment, and the at least one Centralized ICN Routing Coordination Unit controlled by the network operator, the at least one Centralized ICN Routing Coordination Unit dynamically optimizing and adjusting load balancing over the updated at least one ICN route segment.

4. The method of claim 3, wherein exchanging routing information between the at least one Centralized ICN Routing Coordination Unit and the first node, the second node, and the at least one intermediate router comprises sending the routing information using ICN based communication or IP based communication on point-to-point communication links between the at least one Centralized ICN Routing Coordination Unit and the first node, the second node, and the at least one intermediate router.

5. The method of claim 4, wherein exchanging routing information between the at least one Centralized ICN Routing Coordination Unit and the first node, the second node, and the at least one intermediate router comprises sending a routing information table from the at least one Centralized ICN Routing Coordination Unit to the first node, the second node, and the at least one intermediate router.

6. The method of claim 2, further comprising the at least one Centralized ICN Routing Coordination Unit selecting a first updated ICN route segment and a second updated ICN route segment between the first node and the second node, the first updated ICN route segment being selected for transmitting latency sensitive content and the second updated ICN route segment being selected for transmitting high data rate latency tolerant content.

7. The method of claim 2, further comprising providing a Centralized ICN Routing Coordination Unit for respective geographic areas of the ICN.

8. The method of claim 1, wherein sending the ICN control and management message to update the entry in the FIB at the next hop comprises adding an entry in the FIB of the next hop node that identifies the first node and the second node.

9. The method of claim 1, wherein updating at least one ICN route segment between the first node and the second node using ICN control and management messages to provide routing information comprises a distributed ICN routing control and management unit at the first node flooding an ICN-Route-Discovery-Request over multiple ICN route segments between the first node and the second node and a distributed ICN routing control and management unit at the second node selecting one of the ICN route segments and responding to the ICN-Route-Discovery-Request by sending a unicast Route-Discovery-Response to the first node over the selected one of the ICN route segments.

10. The method of claim 1, further comprising receiving a named data function networking (NFN) execution plan that predicts popularity of respective nodes, using the NFN execution plan to predict popularity of nodes in the ICN, selecting nodes in the ICN as the first node and the second node that are predicted by the NFN execution plan to have a higher popularity than non-selected nodes in the ICN, and informing a central router to perform east-west predictive routing of data between the first node and the second node where data and function interests in the ICN are satisfied using a most efficient routing strategy given popularity predictions informed by the NFN execution plan.

11. The method of claim 1, wherein the first node is located in a vehicle and the second node is located in a vehicular network, wherein forwarding the interest packet from the first node to the next hop node comprises sending the interest packet to a road side unit or infrastructure node with context aware data in a unicast communication channel.

12. The method of claim 11, wherein the context aware data comprises at least one of the vehicle's speed, heading, and location.

13. The method of claim 11, further comprising performing context aware caching and routing at the road side unit or infrastructure node based on at least one of location of the vehicle, lifespan of information in the interest packet, and a density of vehicles in the vehicular network.

14. The method of claim 13, wherein routing at the road side unit or infrastructure node comprises checking a local storage for content requested by the interest packet and sending the content to the vehicle.

15. The method of claim 14, wherein when the local storage does not include the requested content, forwarding the interest packet to another node in the updated at least one ICN routing segment based on the context aware data and requested content, and updating the FIB at the road side unit or infrastructure node.

16. The method of claim 15, wherein forwarding the interest packet to another node in the updated at least one ICN routing segment comprises prioritizing the interest packet relative to other interest packets based on at least one of temporal information and spatial information in the context aware data.

17. The method of claim 1, further comprising calculating a maximum delay estimate between the first node and the at least one intermediate node using a moving window of RTT delays between the first node and the at least one intermediate node until a current time can be maintained.

18. The method of claim 1, wherein utilizing the historical cache hit information to determine a cache hit probability for each of the N quantized levels comprises utilizing a machine learning model that has been trained to fit historical content and RTT pairings given a set of features at the first node to predict an estimated RTT at any given time.

19. The method of claim 1, wherein finding the next hop node between the first node and the second node over the updated at least one ICN routing segment using the routing information comprises extracting features from the interest packet including at least one of a packet header, Media Access Control (MAC) and link level addresses of a previous hop, geographic location, a neighbor list and neighbor link qualities, a quality of service requirement, content validation time, past FIB entries, and a past history of the extracted features, applying the extracted features to a neural network to select a next hop node, applying the selected next hop node to the ICN, feeding back as a reward R to the neural network at least one of observed latency, content finding percentage, content hit success, network topology change, cost of forwarding, drop in round-trip time (RTT), and quality of service parameters as a result of application of the selected hop node to the ICN, and minimizing, using an optimization E, a loss function V that is a function of R as well as a loss L resulting from not sending the interest packet to an optimal next hop node, where E is formulated as:

$$\min_{w} E(V(R, L))$$

and where w are weights of the neural network.

20. The method of claim 1, wherein finding the next hop node between the first node and the second node over the updated at least one ICN routing segment using the routing information comprises the FIB mapping the interest packet to at least one next hop node using a parametric function that maps input interests to next hop nodes.

21. The method of claim 19, wherein when a wrong or sub-optimal next hop has been selected, a FULL-FIB-Table node that monitors forwarded interest packets from neighbor nodes forwards the interest packet to an optimal next-hop.

22. An information-centric network (ICN) that maintains route information for forwarding interest packets through the ICN, comprising:
a first node in the ICN;
a second node in the ICN; and
a next hop node between the first node and the second node in the ICN, the next hop node comprising a forwarding information base (FIB),
wherein the first node is adapted to perform operations comprising:
updating at least one ICN route segment between the first node and the second node using ICN control and management messages to provide routing information that maintains load balancing and reduces latency of content retrieval and signaling overhead among the first node, the second node, and any intermediate routers between the first node and the second node;
finding the next hop node over the updated at least one ICN routing segment using the routing information;
forwarding an interest packet from the first node to the next hop node;
sending an ICN control and management message to update an entry in the forwarding information base (FIB) of the next hop node to include an entry for at least the first node;
exchanging the routing information among a distributed ICN routing control and management unit at the first node, a distributed ICN routing control and management unit at the second node, and at least one Centralized ICN Routing Coordination Unit controlled by a network operator, the at least one Centralized ICN Routing Coordination Unit dynamically optimizing and adjusting load balancing over the updated at least one ICN route segment; and
selecting, by the at least one Centralized ICN Routing Coordination Unit, a first updated ICN route segment and a second updated ICN route segment between the first node and the second node, the first updated ICN route segment being selected for transmitting latency sensitive content and the second updated ICN route segment being selected for transmitting high data rate latency tolerant content.

23. A non-transitory computer-readable medium comprising instructions that when executed by a processor cause the processor to perform operations for maintaining information-centric network (ICN) route information between a first node and a second node in the ICN, the operations comprising:
updating at least one ICN route segment between the first node and the second node using ICN control and management messages to provide routing information that maintains load balancing and reduces latency of content retrieval and signaling overhead among the first node, the second node, and any intermediate routers between the first node and the second node;
finding a next hop node between the first node and the second node over the updated at least one ICN routing segment using the routing information;
forwarding an interest packet from the first node to the next hop node;
sending an ICN control and management message to update an entry in a forwarding information base (FIB) at the next hop node to include an entry for at least the first node; and
receiving a named data function networking (NFN) execution plan that predicts popularity of respective nodes, using the NFN execution plan to predict popularity of nodes in the ICN, selecting nodes in the ICN as the first node and the second node that are predicted by the NFN execution plan to have a higher popularity than non-selected nodes in the ICN, and informing a central router to perform east-west predictive routing of data between the first node and the second node where data and function interests in the ICN are satisfied using a most efficient routing strategy given popularity predictions informed by the NFN execution plan.

24. An information-centric network (ICN) that maintains route information for forwarding interest packets through the ICN, comprising:
a first node in the ICN;
a second node in the ICN; and
a next hop node between the first node and the second node in the ICN, the next hop node comprising a forwarding information base (FIB),
wherein the first node comprises:
means for updating at least one ICN route segment between the first node and the second node using ICN control and management messages to provide routing information that maintains load balancing and reduces latency of content retrieval and signaling overhead among the first node, the second node, and any intermediate routers between the first node and the second node, the at least one ICN route segment comprising at least one intermediate node having a data cache:

means for finding the next hop node over the updated at least one ICN routing segment using the routing information;

means for forwarding an interest packet from the first node to the next hop node;

means for sending an ICN control and management message to update an entry in the forwarding information base (FIB) of the next hop node to include an entry for at least the first node; and means for calculating a round-trip time (RTT) between the first node and the at least one intermediate node by partitioning the data cache into N quantized levels where each level has an average RTT, utilizing historical cache hit information to determine a cache hit probability for each of the N quantized levels, and adjusting a rate of sending interest packets by the first node based on a calculated RTT.

* * * * *

UNITED STATES PATENT AND TRADEMARK OFFICE
CERTIFICATE OF CORRECTION

PATENT NO. : 10,917,328 B2
APPLICATION NO. : 16/454427
DATED : February 9, 2021
INVENTOR(S) : Jha et al.

Page 1 of 1

It is certified that error appears in the above-identified patent and that said Letters Patent is hereby corrected as shown below:

In the Claims

In Column 37, Line 2, in Claim 24, delete "cache:" and insert --cache;-- therefor Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*